United States Patent
Ralston et al.

(10) Patent No.: US 8,084,955 B2
(45) Date of Patent: Dec. 27, 2011

(54) SYSTEMS AND METHODS FOR IMPROVED STARTUP AND CONTROL OF ELECTRODELESS PLASMA LAMP USING CURRENT FEEDBACK

(75) Inventors: Paul Ralston, Palo Alto, CA (US); Sandeep Mudunuri, Sunnyvale, CA (US)

(73) Assignee: Luxim Corporation, Sunnyvale, CA (US)

( * ) Notice: Subject to any disclaimer, the term of this patent is extended or adjusted under 35 U.S.C. 154(b) by 577 days.

(21) Appl. No.: 12/178,427

(22) Filed: Jul. 23, 2008

(65) Prior Publication Data
US 2009/0026975 A1 Jan. 29, 2009

Related U.S. Application Data

(60) Provisional application No. 60/951,409, filed on Jul. 23, 2007.

(51) Int. Cl.
*H05B 41/16* (2006.01)
(52) U.S. Cl. ........ 315/248; 315/307; 315/291; 315/194; 315/39
(58) Field of Classification Search .......... 315/248, 315/224, 291, 307, 344, 39, 194; 313/113, 313/153, 231, 634, 636
See application file for complete search history.

(56) References Cited

U.S. PATENT DOCUMENTS

| | | | |
|---|---|---|---|
| 3,787,705 A | 1/1974 | Bolin et al. |
| 3,826,950 A | 7/1974 | Hruda et al. |
| 4,001,631 A | 1/1977 | McNeill et al. |
| 4,206,387 A | 6/1980 | Kramer et al. |
| 4,427,922 A | 1/1984 | Proud et al. |
| 4,485,332 A | 11/1984 | Ury et al. |
| 4,498,029 A | 2/1985 | Yoshizawa et al. |
| 4,633,140 A | 12/1986 | Lynch et al. |
| 4,749,915 A | 6/1988 | Lynch et al. |
| 4,795,658 A | 1/1989 | Kano et al. |
| 4,887,192 A | 12/1989 | Simpson et al. |
| 4,950,059 A | 8/1990 | Roberts |
| 4,975,625 A | 12/1990 | Lynch et al. |
| 4,978,891 A | 12/1990 | Ury |

(Continued)

FOREIGN PATENT DOCUMENTS

JP 8148127 6/1996

(Continued)

OTHER PUBLICATIONS

"Chapter 4—Cavity Resonators, Army Technical Manual, TM 11-673—Generation and Transmission of Microwave Energy", (Jun. 1953), 12 pgs.

(Continued)

*Primary Examiner* — Haiss Philogene
(74) *Attorney, Agent, or Firm* — Schwegman, Lundberg & Woessner, P.A.

(57) ABSTRACT

In one example embodiment, a drive probe is coupled to the lamp body to provide the primary power for ignition and steady state operation of the lamp. Feedback may be used to adjust frequency in response to changing conditions of the lamp during startup. A phase shifter may be used to adjust the phase of the power between ignition and steady state operation. A sensor may detect a lamp operating condition that automatically triggers a shift in phase after the fill in the bulb is vaporized. In another example embodiment, a method for sequentially optimizing the drive power and phase shift applied to the lamp is disclosed that may reliably regulate the lamp current consumption to desired startup and operational levels despite variations in lamp environmental conditions.

22 Claims, 12 Drawing Sheets

U.S. PATENT DOCUMENTS

| | | | |
|---|---|---|---|
| 5,039,903 A | 8/1991 | Farrall | |
| 5,070,277 A | 12/1991 | Lapatovich | |
| 5,072,157 A | 12/1991 | Greb et al. | |
| 5,086,258 A | 2/1992 | Mucklejohn et al. | |
| 5,349,271 A | 9/1994 | van Os et al. | |
| 5,361,274 A | 11/1994 | Simpson et al. | |
| 5,373,217 A | 12/1994 | Gregor | |
| 5,438,242 A | 8/1995 | Simpson | |
| 5,448,135 A | 9/1995 | Simpson | |
| 5,498,937 A | 3/1996 | Korber et al. | |
| 5,525,865 A | 6/1996 | Simpson | |
| 5,594,303 A | 1/1997 | Simpson et al. | |
| 5,786,667 A | 7/1998 | Simpson et al. | |
| 5,811,940 A | 9/1998 | Nutzel | |
| 5,910,710 A | 6/1999 | Simpson | |
| 5,910,754 A | 6/1999 | Simpson et al. | |
| 5,923,116 A | 7/1999 | Mercer et al. | |
| 6,020,800 A | 2/2000 | Arakawa et al. | |
| 6,031,333 A | 2/2000 | Simpson | |
| 6,049,170 A | 4/2000 | Hochi et al. | |
| 6,137,237 A | 10/2000 | MacLennan et al. | |
| 6,246,160 B1 | 6/2001 | MacLennan et al. | |
| 6,252,346 B1 | 6/2001 | Turner et al. | |
| 6,265,813 B1 | 7/2001 | Knox et al. | |
| 6,313,587 B1 | 11/2001 | MacLennan et al. | |
| 6,424,099 B1 | 7/2002 | Kirkpatrick et al. | |
| 6,566,817 B2 | 5/2003 | Lapatovich | |
| 6,617,806 B2 | 9/2003 | Kirkpatrick et al. | |
| 6,666,739 B2 | 12/2003 | Pothoven et al. | |
| 6,737,809 B2 | 5/2004 | Espiau et al. | |
| 6,856,092 B2 | 2/2005 | Pothoven et al. | |
| 6,922,021 B2 | 7/2005 | Espiau et al. | |
| 6,924,495 B1 | 8/2005 | Brickley | |
| 7,034,464 B1 | 4/2006 | Izadian et al. | |
| 7,291,985 B2 | 11/2007 | Espiau et al. | |
| 7,348,732 B2 | 3/2008 | Espiau et al. | |
| 7,358,678 B2 | 4/2008 | Espiau et al. | |
| 7,362,054 B2 | 4/2008 | Espiau et al. | |
| 7,362,055 B2 | 4/2008 | Espiau et al. | |
| 7,362,056 B2 | 4/2008 | Espiau et al. | |
| 7,372,209 B2 | 5/2008 | Espiau et al. | |
| 7,391,158 B2 | 6/2008 | Espiau et al. | |
| 7,429,818 B2 | 9/2008 | Chang et al. | |
| 7,638,951 B2 | 12/2009 | DeVincentis et al. | |
| 7,719,195 B2* | 5/2010 | DeVincentis et al. | 315/39 |
| 7,855,511 B2* | 12/2010 | Espiau et al. | 315/39 |
| 7,880,402 B2* | 2/2011 | DeVincentis et al. | 315/248 |
| 2001/0035720 A1 | 11/2001 | Guthrie et al. | |
| 2002/0047615 A1 | 4/2002 | Yokozeki et al. | |
| 2002/0105274 A1 | 8/2002 | Pothoven et al. | |
| 2005/0212456 A1 | 9/2005 | Espiau et al. | |
| 2005/0286263 A1 | 12/2005 | Champion et al. | |
| 2006/0250090 A9 | 11/2006 | Guthrie et al. | |
| 2007/0109069 A1 | 5/2007 | Espiau et al. | |
| 2007/0241688 A1 | 10/2007 | DeVincentis et al. | |
| 2008/0211971 A1 | 9/2008 | Pradhan | |
| 2009/0026911 A1* | 1/2009 | Hafidi et al. | 313/231.61 |
| 2009/0167201 A1* | 7/2009 | Duelli et al. | 315/248 |

FOREIGN PATENT DOCUMENTS

| | | | |
|---|---|---|---|
| KR | 1020050018587 A | 2/2005 | |
| WO | WO-2006070190 | 7/2006 | |
| WO | WO-2007050889 A2 | 5/2007 | |
| WO | WO-2007050889 A3 | 5/2007 | |
| WO | WO-2007138276 | 12/2007 | |
| WO | WO-2006129102 | 12/2008 | |
| WO | WO-2007126899 A2 | 11/2009 | |
| WO | WO-2010033809 A1 | 3/2010 | |

OTHER PUBLICATIONS

"Chapter 6.3—Rectangular Waveguide Cavities", in: *Microwave Engineering*, Pozar, D. M., Editor (John Wiley & Sons, Inc.), (Jul. 1997), pp. 313-318.

Espiau, F. M., et al., "Plasma Lamp", U.S. Appl. No. 60/022,028, filed Jul. 31, 2000, 28 pgs.

Guthrie, C., et al., "A Corregated Wave-Guide Used for the Excitation of an Electrode-Less Metal Halide Plasma Lamp Incorporating a Solid Dielectric Material", U.S. Appl. No. 60/224,060, filed Aug. 9, 2000, 9 pgs.

Guthrie, C., et al., "A Method for connecting the antenna on a printed wiring board to a wave-guide in a light source in which an electrode-less lamp is built into the wave-guide structure", U.S. Appl. No. 60/224,061, filed Aug. 9, 2000, 9 pgs.

Guthrie, C., "D.R.I. Drawings—Wave Guide Lamp Concept 8 (WGC008); Wave Guide Lamp Concept 9 (WGC009); and Wave Guide Lamp Concept 10 (WGC010)", *Guthriee Exhibit 2173*, Board of Patent Appeals and Inteferences (Interference No. 105,393), (Jun. 28, 2000), 3 pgs.

Guthrie, Charles, et al., "Electrodeless Incandescent Bulb", U.S. Appl. No. 60/639,857, filed Dec. 27, 2004, and Don Wilson, 16 pgs.

Guthrie, Charles, "Lamp", U.S. Appl. No. 60/687,458, filed Jun. 6, 2005, 12 pgs.

Guthrie, Charles, et al., "Lamp", U.S. Appl. No. 60/687,280, filed Jun. 3, 2005, and Neate, 17 pgs.

Inventors Not Listed, "Lamp", International Application Serial No. PCT GB2007 001935, International filing date May 24, 2007, GB Application Serial No. 0610580.3, filed May 30, 2006.

Izadian, J. S., et al., "Generating Light From Electromagnetic Energy", U.S. Appl. No. 60/337,057, filed Nov. 6, 2001, 120 pgs.

Pozar, D. M., "Section 5.8, Tapered Lines", *In: Microwave Engineering*, 3rd Edition, 2005 (John Wiley & Sons, Inc.). (2005), 9 pgs.

Pozar, D. M., "Section 6.4, Circular Waveguide Cavities", *in: Microwave Engineering*, 3rd Edition, 2005 (John Wiley & Sons, Inc.), (2005), 8 pgs.

Prior, G., et al., "Quartz Bulb Enclosed in a Wave-Guide", U.S. Appl. No. 60/234,415, filed Sep. 21, 2000, 5 pgs.

Prior, G., et al., "Wave-Guide Used for the Excitation of an Electrode-Less Metal Halide Plasma Lamp Incorporating a Solid Dielectric Material", U.S. Appl. No. 60/224,059, filed Aug. 9, 2000, 7 pgs.

Prior, G., et al., "Wave-Guide Used for the Excitation of an Electrode-Less Metal Halide Plasma Lamp Incorporating a Solid Dielectric Material", U.S. Appl. No. 60/224,298, filed Aug. 10, 2000, 5 pgs.

Sandberg, E., et al., "A Mechanical Means of Sealing the Window to an Electrode-Less Metal Halide Bulb That Is Integrated Into a Waveguide", U.S. Appl. No. 60/262,536, filed Jan. 17, 2001, 6 pgs.

Sandberg, E., "An Improved Drive Circuit for an Electrode-Less Plasma Lamp That Is Embedded in a Waveguide", U.S. Appl. No. 60/241,198, filed Oct. 17, 2000, 7 pgs.

Sandberg, E., "Light Source for Use in Microdisplay Based Light Engines", U.S. Appl. No. 60/192,731, filed Mar. 27, 2000, 31 pgs.

Smoler, D., "E-Mail to C. Guthrie re: Ridged Waveguide Ideas", (Jun. 27, 2000), 2 pgs.

Wharmby, D. O., "Chapter 11—Electrodeless Lamps", *In: Lamps & Lighting*, 4th Edition, 1997 (Arnold & John Wiley & Sons, Inc., (1997), 13 pgs.

Wharmby, D. O., "Electrodeless Lamps for Lighting: A Review", *IEEE Proceedings-A*, vol. 140 (6), (Nov. 1993), 9 pgs.

Wilson, D., et al., "Use of a Coating to Prevent the Reduction of Ceramic to Elemental Metal in the Bulb of a Wave-Guide Lamp", U.S. Appl. No. 60/224,866, filed Aug. 11, 2000, 3 pgs.

Wilson, D., et al., "Electrode-Less Metal Halide Plasma Lamp with Integrated Electronics", U.S. Appl. No. 60/224,290, filed Aug. 10, 2000, 9 pgs.

Wilson, D., et al., "High Temperature, Low Cost Window Sealing Technique for Plasma Lamps", U.S. Appl. No. 60/224,291, filed Aug. 10, 2000, 5 pgs.

Wilson, D., et al., "Light Source Consisting of an Electrode-Less Metal Halide Plasma Bulb That is Integrated into a Wave-Guide", U.S. Appl. No. 60/224,289, filed Aug. 10, 2000, 6 pgs.

Wilson, D., et al., "Means to Reduce EMI in a Wave-Guide", U.S. Appl. No. 60/224,503, filed Aug. 10, 2000, 20 pgs.

Wilson, D., et al., "R.F. Wave-Guide into Which an Insert of a Hermetric Material That has Been Either Molded or Plasma Deposited", U.S. Appl. No. 60/224,257, filed Aug. 10, 2000, 5 pgs.

Wilson, D., et al., "Use of a Heat Sink in a Plasma Light Source (Located Between a Wave Guide That Incorporates the Bulb and the Drive Electronics", U.S. Appl. No. 60/224,961, filed Aug. 11, 2000, 6 pgs.

Wilson, D., et al., "Use of a Heat Sink in a Plasma Light Source (Located Externally and Surrounding the Lamp Assembly)", U.S. Appl. No. 60/224,617, filed Aug. 11, 2000, 20 pgs.

"U.S. Appl. No. 11/553,881, Notice of Allowance mailed Oct. 20, 2009", 7 pgs.

"International Application Serial No. PCT/US2009/057486, Search Report mailed Nov. 5, 2009", 5 pgs.

"International Application Serial No. PCT/US2009/057486, Written Opinion mailed Nov. 5, 2009", 6 pgs.

\* cited by examiner

SYSTEMS AND METHODS FOR IMPROVED STARTUP AND CONTROL OF ELECTRODELESS PLASMA LAMP USING CURRENT FEEDBACK

RELATED APPLICATIONS

This application claims the priority benefits of U.S. Provisional Application No. 60/951,409, filed Jul. 23, 2007 which is incorporated herein by reference in its entirety.

BACKGROUND

I. Field

The field of the present subject matter relates to systems and methods for generating light, and more particularly to electrodeless plasma lamps.

II. Background

Electrodeless plasma lamps may be used to provide point-like, bright, white light sources. Because electrodes are not used, they may have longer useful lifetimes than other lamps. In an electrodeless plasma lamp, radio frequency power may be coupled into a fill in a bulb to create a light emitting plasma. However, as the fill is ignited and the plasma heats up, the load conditions of the lamp may change. This can impact the startup procedure as well as the electronics used to drive the lamp.

SUMMARY

Example embodiments provide systems and methods for startup and control of an electrodeless plasma lamp. In one example embodiment, a drive probe is coupled to the lamp body to provide the primary power for ignition and steady state operation of the lamp. Feedback may be used to adjust frequency in response to changing conditions of the lamp during startup. A phase shifter may be used to adjust the phase of the power between ignition and steady state operation. A sensor may detect a lamp operating condition that automatically triggers a shift in phase after the fill in the bulb is vaporized.

In another example embodiment, an algorithm for sequentially optimizing the drive power and phase shift applied to the lamp is disclosed that may reliably regulate the lamp current consumption to desired startup and operational levels despite variations in lamp environmental conditions.

It is to be understood that each of the above example embodiments may be used alone or in combination with other example embodiments. A more complete understanding will be gained from a consideration of the following description of the example embodiments read in conjunction with the accompanying drawing figures provided herein. In the figures and description, numerals indicate the various features of example embodiments, like numerals referring to like or the same features throughout both the drawings and description.

BRIEF DESCRIPTION OF THE DRAWINGS

Embodiments are illustrated by way of example, and not limitation, in the figures of the accompanying drawings, in which like references indicate similar elements unless otherwise indicated. In the drawings.

DETAILED DESCRIPTION

Figure 1A:
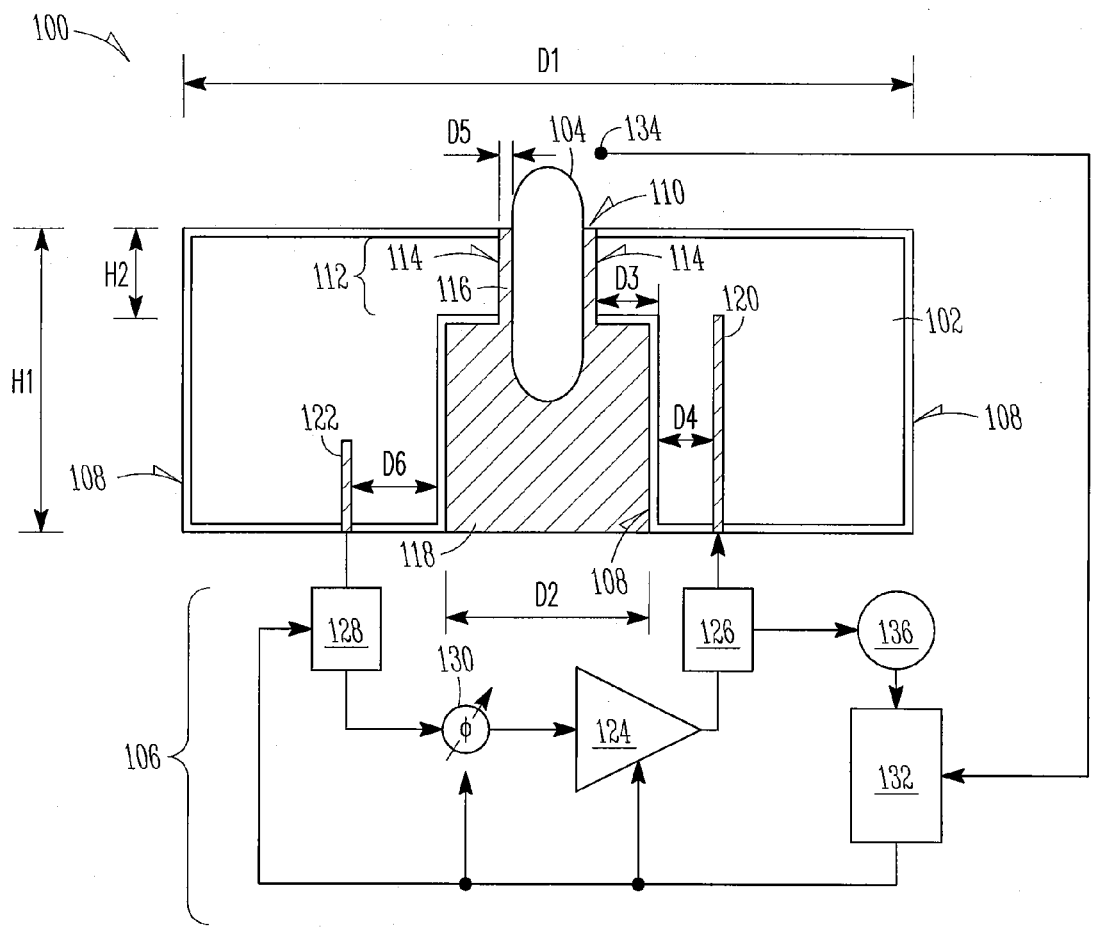
FIG. 1A shows a cross-section and schematic view of a plasma lamp according to an example embodiment.

The example embodiments shown in the drawings will be described herein in detail but it is to be appreciated that the example embodiment are open to various modifications and alternative constructions, As such, there is no intention to limit the examples to the particular forms disclosed. On the contrary, it is intended that all modifications, equivalences and alternative constructions fall within the spirit and scope of the appended claims.

FIG. 1A shows a cross-section and schematic view of a plasma lamp 100 according to an example embodiment. In example embodiments, the plasma lamp 100 may have a lamp body 102 formed from one or more solid dielectric materials and a bulb 104 positioned adjacent to the lamp body 102. The bulb 104 may contain a fill that is capable of forming a light emitting plasma. A lamp drive circuit 106 may couple radio frequency power into the lamp body 102 which, in turn, may be coupled into the fill in the bulb 104 to form the light emitting plasma. In example embodiments, the lamp body 102 forms a waveguide that may contain and guide the radio frequency power. In example embodiments, the radio frequency power may be provided at or near a frequency that resonates within the lamp body 102.

In example embodiments, the lamp body 102 has a relative permittivity greater than air. The frequency required to excite a particular resonant mode in the lamp body 102 may scale inversely to the square root of the relative permittivity (also referred to as the dielectric constant) of the lamp body 102. As a result, a higher relative permittivity may result in a smaller lamp body 102 required for a particular resonant mode at a given frequency of power. The shape and dimensions of the lamp body 102 may also affect the resonant frequency as described further below. In an example embodiment, the lamp body 102 is formed from solid alumina having a relative permittivity of about 9.2. In some embodiments, the dielectric material may have a relative permittivity in the range of from 2 to 100 or any range subsumed therein, or an even higher relative permittivity. In some embodiments, the lamp body 102 may include more than one such dielectric material resulting in an effective relative permittivity for the lamp body 102 within any of the ranges described above. The lamp body 102 may be rectangular, cylindrical or any other shape as described further below.

In example embodiments, the outer surfaces of the lamp body 102 may be coated with an electrically conductive coating 108, such as electroplating or a silver paint or other metallic paint which may be fired onto the outer surface of the lamp body 102. The electrically conductive coating 108 may be grounded to form a boundary condition for the radio frequency power applied to the lamp body 102. The electrically conductive coating 108 may help to contain the radio frequency power in the lamp body 102. Regions of the lamp body 102 may remain uncoated to allow power to be transferred to and/or from the lamp body 102. For example, the bulb 104 may be positioned adjacent to an uncoated portion of the lamp body 102 to receive radio frequency power from the lamp body 102.

In the example embodiment of FIG. 1A, an opening 110 is shown to extend through a thin region 112 of the lamp body 102. The surfaces 114 of the lamp body 102 in the opening 110 may be uncoated and at least a portion of the bulb 104 may be positioned in the opening 110 to receive power from the lamp body 102. In example embodiments, the thickness H2 of the thin region 112 may range from 1 mm to 10 mm or any range subsumed therein and may be less than the outside length and/or interior length of the bulb 104. One or both ends of the bulb 104 may protrude from the opening 110 and extend beyond the electrically conductive coating 108 on the outer surface of the lamp body 102. Such positioning may help avoid damage being done to the ends of the bulb 104 from the high intensity plasma formed adjacent to the region where power is coupled from the lamp body 102. In other example embodiments, all or a portion of the bulb 104 may be positioned in a cavity extending from an opening on the outer surface of the lamp body 102 and terminating in the lamp body 102. In other embodiments, the bulb 104 may be positioned adjacent to an uncoated outer surface of the lamp body 102 or in a shallow recess formed on the outer surface of the waveguide body. In some example embodiments, the bulb 104 may be positioned at or near an electric field maxima for the resonant mode excited in the lamp body 102.

The bulb 104 may be quartz, sapphire, ceramic or other material and may be cylindrical, pill shaped, spherical or other shape. In one example embodiment, the bulb 104 is cylindrical in the center and forms a hemisphere at each end. In one example, the outer length (from tip to tip) is about 15 mm and the outer diameter (at the center) is about 5 mm In this example, the interior of the bulb 104 (which contains the fill) has an interior length of about 9 mm and an interior diameter (at the center) of about 2 mm. The wall thickness is about 1.5 mm along the sides of the cylindrical portion and about 2.25 mm on one end and about 3.75 mm on the other end. In other example embodiments, the bulb 104 may have an interior width or diameter in a range between about 2 and 30 mm or any range subsumed therein, a wall thickness in a range between about 0.5 and 4 mm or any range subsumed therein, and an interior length between about 2 and 30 mm or any range subsumed therein. These dimensions are examples only and other embodiments may use bulbs having different dimensions.

In example embodiments, the bulb 104 contains a fill that forms a light emitting plasma when radio frequency power is received from the lamp body 102. The fill may include a noble gas and a metal halide. Additives such as Mercury may also be used. An ignition enhancer may also be used. A small amount of an inert radioactive emitter such as $Kr_{85}$ may be used for this purpose. In other embodiments, different fills such as Sulfur, Selenium or Tellurium may also be used. In some examples, a metal halide such as Cesium Bromide may be added to stabilize a discharge of Sulfur, Selenium or Tellurium.

In some example embodiments, a high pressure fill is used to increase the resistance of the gas at startup. This can be used to decrease the overall startup time required to reach full brightness for steady state operation. In one example, a noble gas such as Neon, Argon, Krypton or Xenon is provided at high pressures between 100 Torr to 3000 Torr or any range subsumed therein. Pressures less than or equal to 760 Torr may be desired in some embodiments to facilitate filling the bulb 104 at or below atmospheric pressure. In some example embodiments, pressures between 400 Torr and 600 Torr are used to enhance starting. Example high pressure fills may also include metal halide and Mercury which have a relatively low vapor pressure at room temperature. An ignition enhancer such as $Kr_{85}$ may also be used. In a particular example, the fill includes 1.608 mg Mercury, 0.1 mg Indium Bromide and about 200 nanoCurie of $Kr_{85}$. In this example, Argon or Krypton is provided at a pressure in the range of about 100 Torr to 600 Torr, depending upon desired startup characteristics. Initial breakdown of the noble gas may more difficult at higher pressure, but the overall warm up time required for the fill to fully vaporize and reach peak brightness may be reduced. The above pressures are measured at 22° C. (room temperature). It is understood that much higher pressures may be achieved at operating temperatures after the plasma is formed. These pressures and fills are examples only and other pressures and fills may be used in other embodiments.

A layer of material 116 may be placed between the bulb 104 and the dielectric material of lamp body 102. In example embodiments, the layer of material 116 may have a lower thermal conductivity than the lamp body 102 and may be used to optimize thermal conductivity between the bulb 104 and the lamp body 102. In an example embodiment, the layer 116 may have a thermal conductivity in the range of about 0.5 to 10 watts/meter-Kelvin (W/mK) or any range subsumed therein. For example, alumina powder with 55% packing density (45% fractional porosity) and thermal conductivity in a range of about 1 to 2 watts/meter-Kelvin (W/mK) may be used. In some embodiments, a centrifuge may be used to pack the alumina powder with high density. In an example embodiment, a layer of alumina powder is used with a thickness D5 within the range of about ⅛ mm to 1 mm or any range subsumed therein. Alternatively, a thin layer of a ceramic-based adhesive or an admixture of such adhesives may be used. Depending on the formulation, a wide range of thermal conductivities are available. In practice, once a layer composition is selected having a thermal conductivity close to the desired value, fine-tuning may be accomplished by altering the layer thickness. Some example embodiments may not include a separate layer of material around the bulb 104 and may provide a direct conductive path to the lamp body 102.

Alternatively, the bulb 104 may be separated from the lamp body 102 by an air-gap (or other gas filled gap) or vacuum gap.

In some example embodiments, alumina powder or other material may also be packed into a recess 118 formed below the bulb 104. In the example shown in FIG. 1A, the alumina powder in the recess 118 is outside the boundaries of the waveguide formed by the electrically conductive material 108 on the surfaces of the lamp body 102. The material in the recess 118 provides structural support, reflects light from the bulb 104 and provides thermal conduction. One or more heat sinks may also be used around the sides and/or along the bottom surface of the lamp body 102 to manage temperature. Thermal modeling may be used to help select a lamp configuration providing a high peak plasma temperature resulting in high brightness, while remaining below the working temperature of the bulb material. Example thermal modeling software includes the TAS software package available commercially from Harvard Thermal, Inc. of Harvard, Mass.

In example embodiments, lamp 100 has a drive probe 120 inserted into the lamp body 102 to provide radio frequency power to the lamp body 102. In the example of FIG. 1A, the lamp also has a feedback probe 122 inserted into the lamp body 102 to sample power from the lamp body 102 and provide it as feedback to the lamp drive circuit 106. In an example embodiment, the probes 120 and 122 may be brass rods glued into the lamp body 102 using silver paint. In other embodiments, a sheath or jacket of ceramic or other material may be used around the bulb 104, which may change the coupling to the lamp body 102. In an example embodiment, a printed circuit board (pcb) may be positioned transverse to the lamp body 102 for the drive electronics. The probes 120 and 122 may be soldered to the pcb and extend off the edge of the pcb into the lamp body 102 (parallel to the pcb and orthogonal to the lamp body 102). In other embodiments, the probes may be orthogonal to the pcb or may be connected to the lamp drive circuit through SMA connectors or other connectors. In an alternative embodiment, the probes may be provided by a pcb trace and portions of the pcb board containing the trace may extend into the lamp body 102. Other radio frequency feeds may be used in other embodiments, such as microstrip lines or fin line antennas.

In an example embodiment, the drive probe 120 is positioned closer to the bulb 104 in the center of the lamp body 102 than the electrically conductive material 108 around the outer circumference of the lamp body 102. This positioning of the drive probe 120 may be used to improve the coupling of power to the plasma in the bulb 104.

A lamp drive circuit 106 including a power supply, such as amplifier 124, may be coupled to the drive probe 120 to provide the radio frequency power. The amplifier 124 may be coupled to the drive probe 120 through a matching network 126 to provide impedance matching. In an example embodiment, the lamp drive circuit 106 is matched to the load (formed by the lamp body 102, bulb 104 and plasma) for the steady state operating conditions of the lamp. The lamp drive circuit 106 may be matched to the load at the drive probe 120 using the matching network 126.

A high efficiency amplifier may have some unstable regions of operation. The amplifier 124 and phase shift imposed by the feedback loop of the lamp circuit 106 should be configured so that the amplifier 124 operates in stable regions even as the load condition of the lamp 102 changes. The phase shift imposed by the feedback loop may be determined by the length of the loop (including matching network 126) and any phase shift imposed by circuit elements such as a phase shifter 130. At initial startup before the noble gas in the bulb 104 is ignited, the load may appear to the amplifier 124 as an open circuit. The load characteristics may change as the noble gas ignites, the fill vaporizes and the plasma heats up to steady state operating conditions. In various example embodiments, the amplifier and feedback loop are designed so the amplifier will operate within stable regions across the load conditions that may be presented by the lamp body 102, bulb 104 and plasma. The amplifier 124 may include impedance matching elements such as resistive, capacitive and inductive circuit elements in series and/or in parallel. Similar elements may be used in the matching network. In an example embodiment, the matching network is formed from a selected length of pcb trace that is included in the lamp drive circuit between the amplifier 124 and the drive probe 120. These elements are selected both for impedance matching and to provide a phase shift in the feedback loop that keeps the amplifier 124 within stable regions of its operation. A phase shifter 130 may be used to provide additional phase shifting as needed to keep the amplifier 124 in stable regions.

The amplifier 124 and phase shift in the feedback loop may be designed by looking at the reflection coefficient $\Gamma$, which is a measure of the changing load condition over the various phases of lamp 100 operation, particularly the transition from cold gas at start-up to hot plasma at steady state. $\Gamma$, defined with respect to a reference plane at the amplifier output, is the ratio of the "reflected" electric field $E_{in}$ heading into the amplifier, to the "outgoing" electric field $E_{out}$ traveling out. Being a ratio of fields, $\Gamma$ is a complex number with a magnitude and phase. One way to depict changing conditions in a system may be to use a "polar-chart" plot of $\Gamma$'s behavior (termed a "load trajectory") on the complex plane. Certain regions of the polar chart may represent unstable regions of operation for the amplifier 124. The amplifier 124 and phase shift in the feedback loop may be designed so the load trajectory does not cross an unstable region. The load trajectory can be rotated on the polar chart by changing the phase shift of the feedback loop (by using the phase shifter 130 and/or adjusting the length of the circuit loop formed by the lamp drive circuit 106 to the extent permitted while maintaining the desired impedance matching). The load trajectory can be shifted radially by changing the magnitude (e.g., by using an attenuator).

In example embodiments, radio frequency power may be provided at a frequency in the range of between about 0.1 GHz and about 10 GHz or any range subsumed therein. The radio frequency power may be provided to drive probe 120 at or near a resonant frequency for lamp body 102. The frequency may be selected based on the dimensions, shape and relative permittivity of the lamp body 102 to provide resonance in the lamp body 102. In example embodiments, the frequency is selected for a fundamental resonant mode of the lamp body 102, although higher order modes may also be used in some embodiments. In other examples, power may be provided at a resonant frequency and/or at one or more frequencies within 1 to 50 MHz above or below the resonant frequency or any range subsumed therein. In another example, the power may be provided at one or more frequencies within the resonant bandwidth for at least one resonant mode. The resonant bandwidth is the full frequency width at half maximum of power on either side of the resonant frequency (on a plot of frequency versus power for the resonant cavity).

In example embodiments, the amplifier 124 may be operated in multiple operating modes at different bias conditions to improve starting and then to improve overall amplifier efficiency during steady state operation. For example, the amplifier may be biased to operate in Class A/B mode to provide better dynamic range during startup and in Class C mode during steady state operation to provide more efficiency. The amplifier 124 may also have a gain control that can be used to adjust the gain of the amplifier 124. The Amplifier 124 may further include either a plurality of gain stages or a single stage.

In various examples, the feedback probe 122 is coupled to the input of the amplifier 124 through an attenuator 128 and phase shifter 130. The attenuator 128 is used to adjust the power of the feedback signal to an appropriate level for input to the phase shifter 130. In some embodiments, a second attenuator may be used between the phase shifter 130 and the amplifier 124 to adjust the power of the signal to an appropriate level for amplification by the amplifier 124. In some example embodiments, the attenuator(s) may be variable attenuators controlled by the control electronics 132. In other embodiments, the attenuators may be set to a fixed value. In some example embodiments, the lamp drive circuit 105 may not include an attenuator. In an example embodiment, the phase shifter 130 may be a voltage-controlled phase shifter controlled by the control electronics 132.

The feedback loop may automatically oscillate at a frequency based on the load conditions and phase of the feedback signal. This feedback loop may be used to maintain a resonant condition in the lamp body 102 even though the load conditions change as the plasma is ignited and the temperature of the lamp changes. If the phase is such that constructive interference occurs for waves of a particular frequency circulating through the loop, and if the total response of the loop (including the amplifier 124, lamp 100, and all connecting elements) at that frequency is such that the wave is amplified rather than attenuated after traversing the loop, the loop may oscillate at that frequency. Whether a particular setting of the phase-shifter 128 induces constructive or destructive feedback depends on frequency. The phase-shifter 128 may be used to finely tune the frequency of oscillation within the range supported by the lamp's frequency response. In doing so, it may also effectively tune how well RF power is coupled into the lamp 100 because power absorption is frequency-dependent. Thus, the phase-shifter 128 may provide fast, finely-tunable control of the lamp output intensity. Both tuning and detuning may be useful. For example: tuning can be used to maximize intensity as component aging changes the overall loop phase; detuning can be used to control lamp dimming. In some example embodiments, the phase selected for steady state operation may be slightly out of resonance, so maximum brightness is not achieved. This may be used to leave room for the brightness to be increased and/or decreased by control electronics 132.

In FIG. 1A, control electronics 132 is connected to attenuator 128, phase shifter 130 and amplifier 124. The control electronics 132 provide signals to adjust the level of attenuation provided by the attenuator 128, phase of phase shifter 130, the class in which the amplifier 124 operates (e.g., Class A/B, Class B or Class C mode) and/or the gain of the amplifier 124 to control the power provided to the lamp body 102. In one example, the amplifier 124 has three stages, a pre-driver stage, a driver stage and an output stage, and the control electronics 132 provides a separate signal to each stage (drain voltage for the pre-driver stage and gate bias voltage of the driver stage and the output stage). The drain voltage of the pre-driver stage can be adjusted to adjust the gain of the amplifier. The gate bias of the driver stage can be used to turn on or turn off the amplifier. The gate bias of the output stage can be used to choose the operating mode of the amplifier 124 (e.g., Class A/B, Class B or Class C). Control electronics 132 can range from a simple analog feedback circuit to a microprocessor/microcontroller with embedded software or firmware that controls the operation of the lamp drive circuit 106. The control electronics 132 may include a lookup table or other memory that contains control parameters (e.g., amount of phase shift or amplifier gain) to be used when certain operating conditions are detected. In example embodiments, feedback information regarding the lamp's 100 light output intensity is provided either directly by an optical sensor 134, e.g., a silicon photodiode sensitive in the visible wavelengths, or indirectly by an RF power sensor 136, e.g., a rectifier. The RF power sensor 136 may be used to determine forward power, reflected power or net power at the drive probe 120 to determine the operating status of the lamp. A directional coupler may be used to tap a small portion of the power and feed it to the RF power sensor 136. An RF power sensor 136 may also be coupled to the lamp drive circuit 106 at the feedback probe 122 to detect transmitted power for this purpose. In some embodiments, the control electronics 132 may adjust the phase shifter 130 on an ongoing basis to automatically maintain desired operating conditions.

High frequency simulation software may be used to help select the materials and shape of the lamp body 102 and electrically conductive coating 108 to achieve desired resonant frequencies and field intensity distribution in the lamp body 102. Simulations may be performed using software tools such as HFSS, available from Ansoft, Inc. of Pittsburgh, Pa., and FEMLAB, available from COMSOL, Inc. of Burlington, Mass. to determine the desired shape of the lamp body 102, resonant frequencies and field intensity distribution. The desired properties may then be fine-tuned empirically.

Figure 1B:
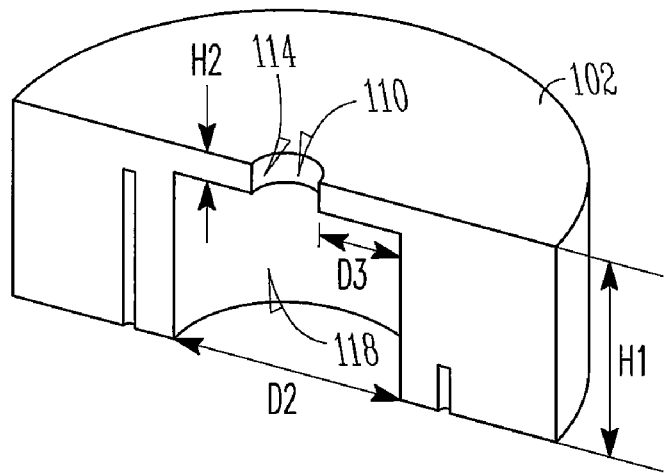
FIG. 1B shows a perspective cross section view of a lamp body with a cylindrical outer surface according to an example embodiment.
Figure 1C:
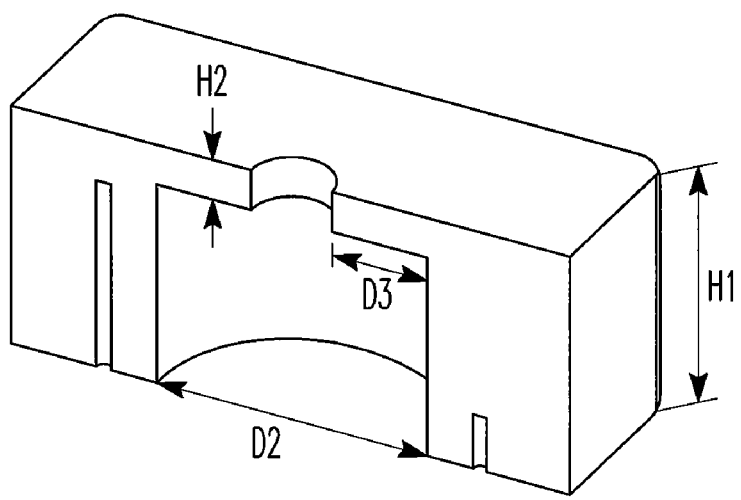
FIG. 1C shows a perspective cross section view of a lamp body with a rectangular outer surface according to an alternative example embodiment.

While a variety of materials, shapes and frequencies may be used, one example embodiment includes a lamp body 102 designed to operate in a fundamental TM resonant mode at a frequency of about 880 MHz (although the resonant frequency changes as lamp operating conditions change as described further below). In this example, the lamp has an alumina lamp body 102 with a relative permittivity of 9.2. The lamp body 102 has a cylindrical outer surface as shown in FIG. 1B with a recess 118 formed in the bottom surface. In an alternative embodiment shown in FIG. 1C, the lamp body 102 may have a rectangular outer surface. The outer diameter D1 of the lamp body 102 in FIG. 1B is about 40.75 mm and the diameter D2 of the recess 118 is about 8 mm. The lamp body 102 has a height H1 of about 17 mm. A narrow region 112 forms a shelf over the recess 118. The thickness H2 of the narrow region 112 is about 2 mm. As shown in FIG. 1A, in this region of the lamp body 102 the electrically conductive surfaces on the lamp body 102 are only separated by the thin region 112 of the shelf. This results in higher capacitance in this region of the lamp body 102 and higher electric field intensities. This shape has been found to support a lower resonant frequency than a solid cylindrical body having the same overall diameter D1 and height H1 or a solid rectangular body having the same overall width and height.

In this example, a hole 110 is formed in the thin region 112. The hole has a diameter of about 5.5 mm and the bulb 104 has an outer diameter of about 5 mm. The shelf formed by the thin region 112 extends radially from the edge of the hole 110 by a distance D3 of about 1.25 mm. Alumina powder is packed between the bulb 104 and the lamp body 102 and forms a layer having a thickness D5 of about ¼ mm. The bulb 104 has an outer length of about 15 mm and an interior length of about 9 mm. The interior diameter at the center is about 2 mm and the side walls have a thickness of about 1.5 mm. The bulb 104 protrudes from the front surface of the lamp body 102 by about 4.7 mm. The bulb 104 has a high pressure fill of Argon, $Kr_{85}$, Mercury and Indium Bromide as described above. At pressures above 400 Torr, a sparker or other ignition aid may be used for initial ignition. Aging of the bulb 104 may facilitate fill breakdown, and the fill may ignite without a separate ignition aid after burn-in of about 72 hours.

In this example, the drive probe 120 is about 15 mm long with a diameter of about 2 mm. The drive probe 120 is about 7 mm from the central axis of the lamp body 102 and a distance D4 of about 3 mm from the electrically conductive material 108 on the inside surface of recess 118. The relatively short distance from the drive probe 120 to the bulb 104 may enhance coupling of power. In one example, a 15 mm hole is drilled for the feedback probe 122 to allow the length and coupling to be adjusted. The unused portion of the hole may be filled with PTFE (Teflon) or another material. In this example, the feedback probe 122 has a length of about 3 mm and a diameter of about 2 mm. In another embodiment where the length of the hole matches the length of the feedback probe 122, the length of the feedback probe 122 is about 1.5 mm.

In this example, the lamp drive circuit 106 includes an attenuator 128, phase shifter 130, amplifier 124, matching network 126 and control electronics 132 such as a microprocessor or microcontroller that controls the drive circuit. A sensor 134 may detect the intensity of light emitted by the bulb 104 and provide this information to the control electronics 132 to control the drive circuit 106. In an alternative embodiment, an RF power sensor 136 may be used to detect forward, reflected or net power to be used by the control electronics to control the drive circuit 106.

The power to the lamp body 102 may be controlled to provide a desired startup sequence for igniting the plasma. As the plasma ignites and heats up during the startup process, the impedance and operating conditions of the lamp change. In order to provide for efficient power coupling during steady state operation of the lamp 102, in an example embodiment, the lamp drive circuit 106 is impedance matched to the steady state load of the lamp body 102, bulb 104 and plasma after the plasma is ignited and reaches steady state operating conditions. This may allow power to be critically coupled from the drive circuit 106 to the lamp body 102 during steady state operation. However, the power from the drive circuit 106 may be overcoupled to the lamp body 102 at startup. As a result, much of the power from the drive circuit 106 is reflected when the lamp 100 is initially turned on. For example, the amplifier 124 may provide about 170 watts of forward power, but more than half of this power may be reflected at startup. The net power to the lamp 100 may be only between about 40-80 watts when the power is initially turned on, and the rest may be reflected.

In one example startup procedure, the lamp 100 starts at a frequency of about 895 MHz and the Argon ignites almost immediately. Upon ignition, the frequency drops to about 880 MHz due to the change in impedance from the ignition of the Argon. The Mercury then vaporizes and heats up. The Indium Bromide also vaporizes and light is emitted at full brightness. When this light is detected by the sensor 134, the phase shifter 130 is adjusted to accommodate for the change in frequency due to the change in the impedance of the plasma. With the appropriate phase shift, the feedback loop adjusts the frequency to about 885 MHz. In an example embodiment, when this startup process is used with a high pressure fill as described above, the startup process from power on to full vaporization of the fill may be completed in about 5-10 seconds or less. As a result, full brightness may be achieved very rapidly.

As the plasma continues to heat up, the impedance continues to change and the frequency continues to drop until the lamp reaches steady state operating conditions. As the frequency changes, the phase of the phase shifter 130 may continue to be adjusted to match the changes in frequency. In an example startup procedure, the frequency ramps down to a steady state operating frequency of about 877 MHz. This ramp may take several minutes. In order to avoid a drop in brightness, the control electronics 132 adjusts the phase of the phase shifter 130 in stages to match the ramp. A lookup table in the control electronics 132 may be used to store a sequence of parameters indicating the amount of phase shift to be used by the control electronics 132 during the ramp. In one example, the voltage to be applied to the phase shifter 130 is stored in the lookup table for startup (ignition), full brightness of the plasma (light mode) and steady state after the lamp 100 is heated (run mode). The control electronics 132 may use these parameters to shift the phase in increments between full vaporization of the fill and completion of heat up. In one example, the lookup table may linearly interpolate between the desired phase at full vaporization (light mode) when the frequency is about 885 MHz and the desired phase at the end of heat up (run mode) when the frequency is about 877 MHz. In one example, firmware in the control electronics 132 linearly interpolates sixteen values for the phase voltage that are applied in equal increments over a period of about 5 minutes as the lamp 100 ramps from light mode to run mode. The phase adjustments and ramp may be determined empirically and programmed into the lookup table based on the operating conditions of the particular lamp. In an alternative embodiment, the control electronics 132 may automatically shift the phase periodically to determine whether a change in one direction or another results in more efficient power coupling and/or higher brightness (based on feedback from an optical sensor or rf power sensor in the drive circuit). This periodic phase shift can be performed very rapidly, so an observer does not notice any visible change in the light output intensity.

The phase of the phase shifter 130 and/or gain of the amplifier 124 may also be adjusted after startup to change the operating conditions of the lamp 100. For example, the power input to the plasma in the bulb 104 may be modulated to modulate the intensity of light emitted by the plasma. This can be used for brightness adjustment or to modulate the light to adjust for video effects in a projection display. For example, a projection display system may use a microdisplay that controls intensity of the projected image using pulse-width modulation (PWM). PWM achieves proportional modulation of the intensity of any particular pixel by controlling, for each displayed frame, the fraction of time spent in either the "ON" or "OFF" state. By reducing the brightness of the lamp during dark frames of video, a larger range of PWM values may be used to distinguish shades within the frame of video. The brightness of the lamp may also be modulated during particular color segments of a color wheel for color balancing or to compensate for green snow effect in dark scenes by reducing the brightness of the lamp 100 during the green segment of the color wheel.

In another example, the phase shifter 130 can be modulated to spread the power provided by the lamp circuit 106 over a larger bandwidth. This can reduce ElectroMagnetic Interference (EMI) at any one frequency and thereby help with compliance with FCC regulations regarding EMI. In example embodiments, the degree of spectral spreading may be from 5-30% or any range subsumed therein. In one example, the control electronics 132 may include circuitry to generate a sawtooth voltage signal and sum it with the control voltage signal to be applied to the phase shifter 130. In another example, the control electronics 132 may include a microcontroller that generates a PWM signal that is passed through an external low-pass filter to generate a modulated control voltage signal to be applied to the phase shifter 130. In example embodiments, the modulation of the phase shifter 130 can be provided at a level that is effective in reducing EMI without any significant impact on the plasma in the bulb 104.

In example embodiments, the amplifier 124 may also be operated at different bias conditions during different modes of operation for the lamp 100. The bias condition of the amplifier 124 may impact DC-RF efficiency. For example, an amplifier biased to operate in Class C mode is more efficient than an amplifier biased to operate in Class B mode, which in turn is more efficient than an amplifier biased to operate in Class A/B mode. However, an amplifier biased to operate in Class A/B mode has a better dynamic range than an amplifier biased to operate in Class B mode, which in turn has better dynamic range than an amplifier biased to operate in Class C mode.

In one example, when the lamp is first turned on, amplifier 124 is biased in a Class A/B mode. Class A/B provides better dynamic range and more gain to allow amplifier 124 to ignite the plasma and to follow the resonant frequency of the lamp 100 as it adjusts during startup. Once the lamp 100 reaches full brightness, amplifier bias is removed which puts amplifier 124 into a Class C mode. This may provide improved efficiency. However, the dynamic range in Class C mode may not be sufficient when the brightness of the lamp 100 is modulated below a certain level (e.g., less than 70% of full brightness). When the brightness is lowered below the threshold, the amplifier 124 may be changed back to Class A/B mode. Alternatively, Class B mode may be used in some embodiments.

The above dimensions, shape, materials and operating parameters are examples only and other embodiments may use different dimensions, shape, materials and operating parameters.

Figure 1D:
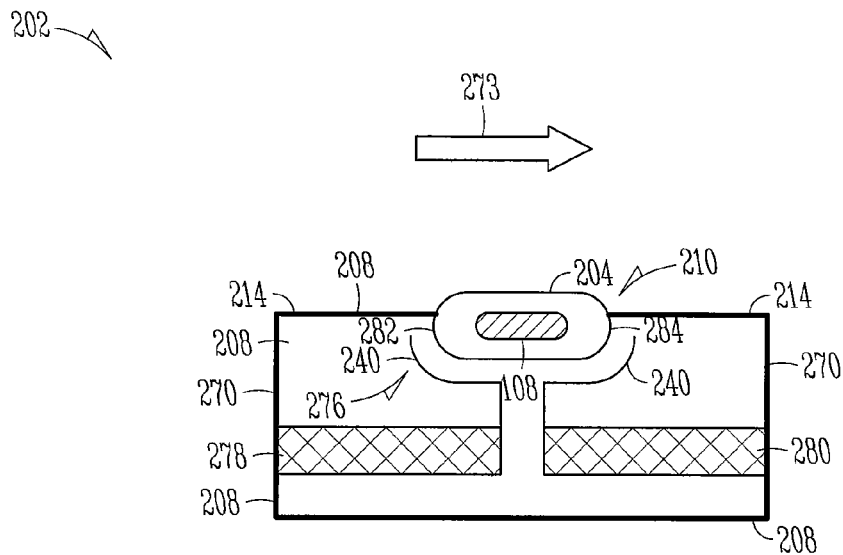
FIG. 1D shows a cross-section and schematic views of a plasma lamp, according to an example embodiment, in which a bulb of the lamp is orientated to enhance an amount of collectable light.

FIG. 1D shows a cross-section and schematic view of a plasma lamp 200 according to an example embodiment. The plasma lamp 200 may have a lamp body 202 formed from one or more solid dielectric materials and a bulb 204 positioned adjacent to the lamp body 202. The bulb 204 contains a fill that is capable of forming a light emitting plasma. A lamp drive circuit (e.g., a lamp drive circuit 206 shown by way of example in FIG. 1H) couples radio frequency (RF) power into the lamp body 202 which, in turn, is coupled into the fill in the bulb 204 to form the light emitting plasma. In example embodiments, the lamp body 202 forms a structure that contains and guides the radio frequency power.

In the plasma lamp 200 the bulb 204 is shown to be positioned or orientated so that a length of a plasma arc 268 generally faces a lamp opening 210 (as opposed to facing side walls 270) to increase an amount of collectable light emitted from the plasma arc 268 in a given etendue. Since the length of plasma arc 268 orients in a direction of an applied electric field, the lamp body 202 and the coupled RF power may provide an electric field 273 that is aligned or substantially parallel to the length of the bulb 204 and a front or upper surface 214 of the lamp body 202. Thus, in an example embodiment, the length of the plasma arc 268 may be substantially (if not completely) visible from outside the lamp body 202. In example embodiments, collection optics 274 may be in the line of sight of the full length of the bulb 204 and plasma arc 268. In other examples, about 40%-100%, or any range subsumed therein, of the plasma arc 268 may be visible to the collection optics 274 in front of the lamp 200. Accordingly, the amount of light emitted from the bulb 204 and received by the collection optics 274 may be enhanced. In example embodiments, a substantial amount of light may be emitted out of the lamp 200 from the plasma arc 268 through a front side wall of the lamp 200 without any internal reflection.

As described herein, the lamp body 202 is configured to realize the necessary resonator structure such that the light emission of the lamp 200 is enabled while satisfying Maxwell's equations.

In FIG. 1D, the lamp 200 is shown to include a lamp body 202 including a solid dielectric body and an electrically conductive coating 208 which extends to the front or upper surface 214. The lamp 200 is also shown to include dipole arms 276 and conductive elements 278, 280 (e.g., metallized cylindrical holes bored into the body 202) to concentrate the electric field present in the lamp body 202. The dipole arms 276 may thus define an internal dipole. In an example embodiment, a resonant frequency applied to a lamp body 202 without dipole arms 276 and conductive elements 278, 280 would result in a high electric field at the center of the solid dielectric lamp body 202. This effect would result from the intrinsic resonant frequency response of the lamp body 202 due to its shape, dimensions and relative permittivity. However, in the example embodiment of FIG. 1D, the shape of the standing waveform inside the lamp body 202 is substantially modified by the presence of the dipole arms 276 and conductive elements 278, 280 and the electric field maxima is brought out to end portions 282, 284 of the bulb 204 using the internal dipole structure. This results in the electric filed 273 near the upper surface 214 of the lamp 200 that is substantially parallel to the length of the bulb 204. In some example embodiments, this electric field is also substantially parallel to a drive probe 220 and feedback probe 222 (see FIG. 1H below).

That the plasma arc 268 in lamp 200 is oriented such that it presents a long side to the lamp exit aperture or opening 210 may provide various effects. The basic physical difference relative to an "end-facing" orientation of the plasma arc 268 is that much of the light can exit the lamp 200 without suffering multiple reflections within the lamp body 202. Therefore, a specular reflector may show a significant improvement in light collection performance over a diffuse reflector that may be utilized in a lamp with an end facing orientation. An example embodiment of a specular reflector geometry that may be used in some embodiments is a parabolic line reflector, positioned such that the plasma arc lies in the focal-line of the reflector.

Another difference may lie in that the side wall of the bulb 204 can be relatively thick, without unduly inhibiting light collection performance. Again, this is because the geometry of the plasma arc 268 with respect to the lamp opening 210 is such that the most of the light emanating from the plasma arc 268 will traverse thicker walls at angles closer to normal, and will traverse them only once or twice (or at least a reduced number of times). In example embodiments, the side wall of the bulb 204 may have a thickness in the range of about 1 mm to 10 mm or any range subsumed therein. In one example, a wall thickness greater than the interior diameter or width of the bulb 204 may be used (e.g., 2-4 mm in some examples). Thicker walls may allow higher power to be coupled to the bulb 204 without damaging the wall of the bulb 204. This is an example only and other embodiments may use other bulbs. It will be appreciated that the bulb 204 is not restricted to a circular cylindrical shape and may have more than one side wall.

Figure 1E:
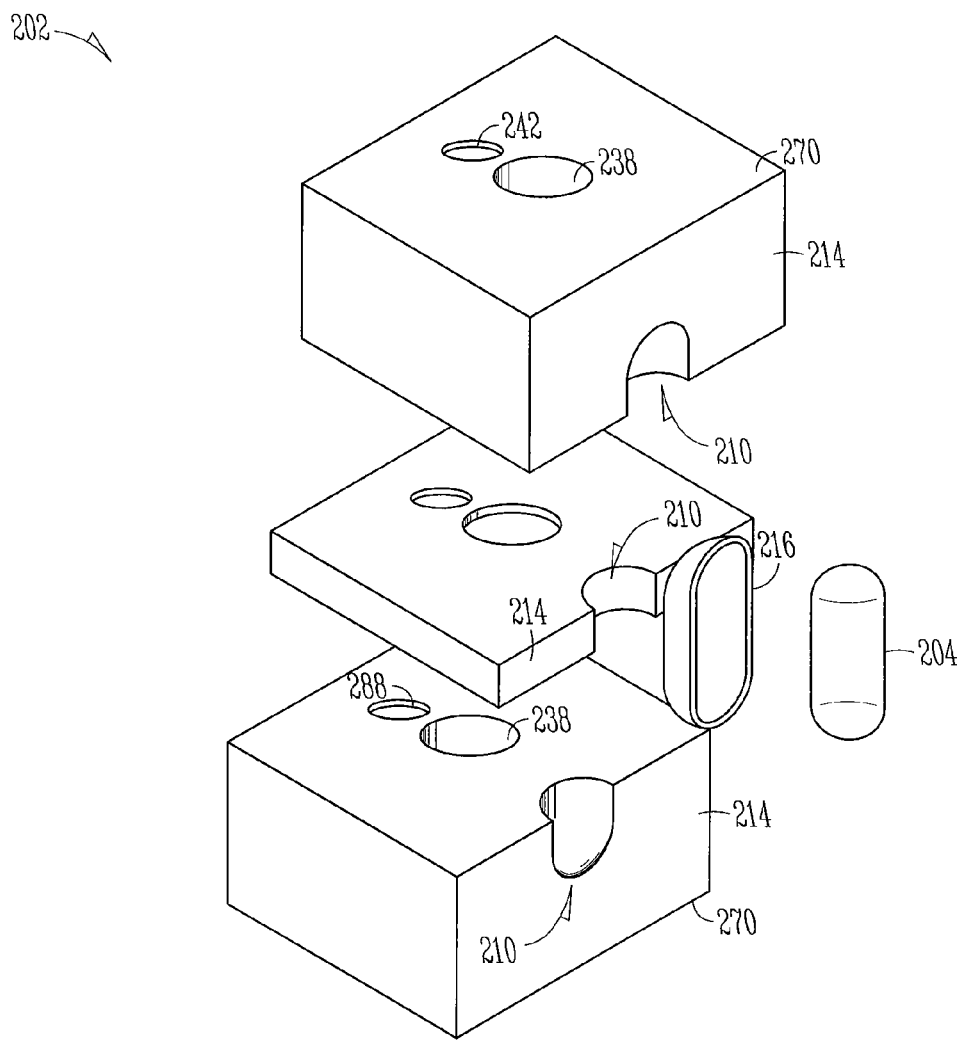
FIG. 1E shows a perspective exploded view of a lamp body, according to an example embodiment, and a bulb positioned horizontally relative to an outer upper surface of the lamp body.
Figure 1F:
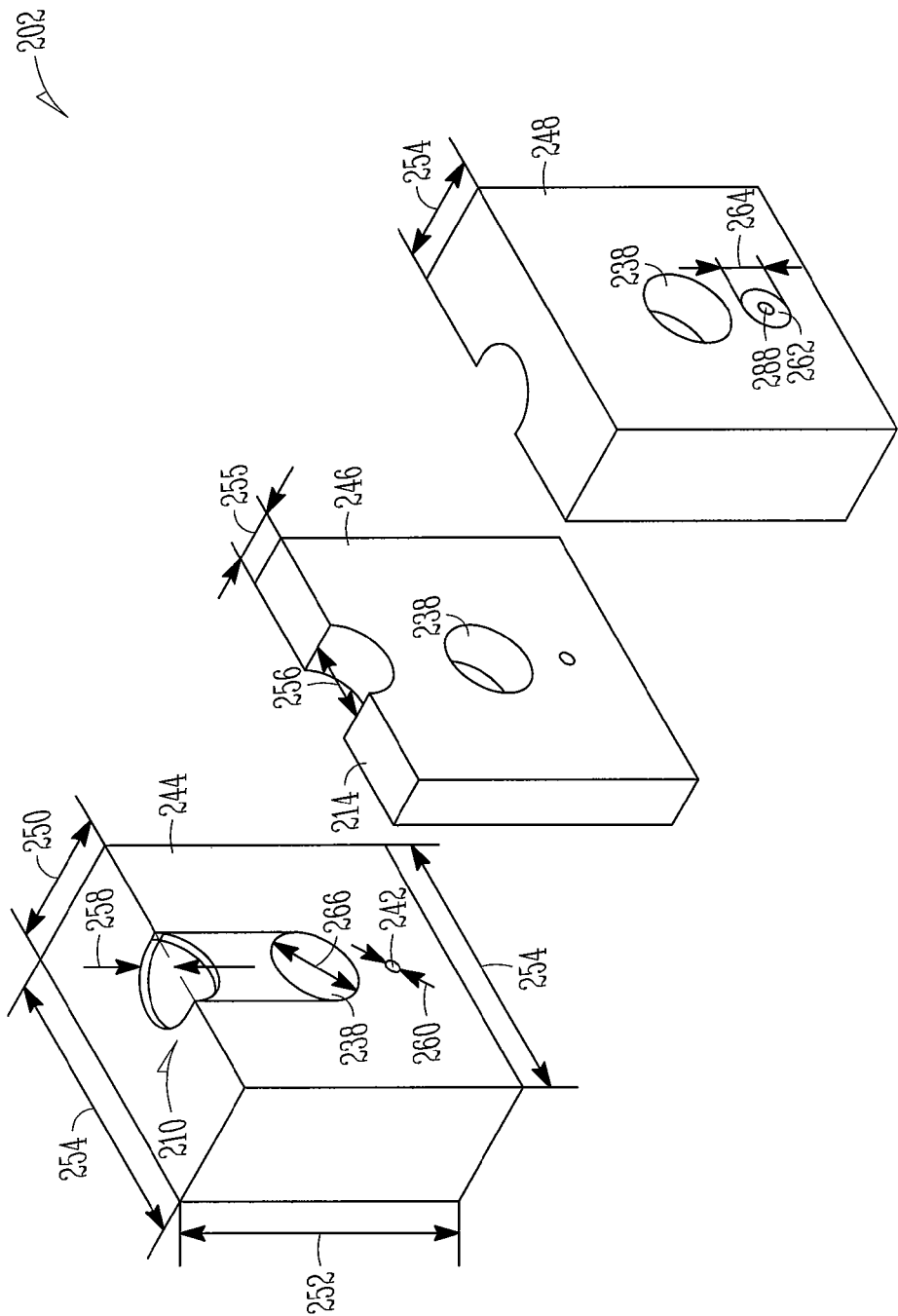
FIG. 1F shows another perspective exploded view of the lamp body of FIG. 1D.
Figure 1G:
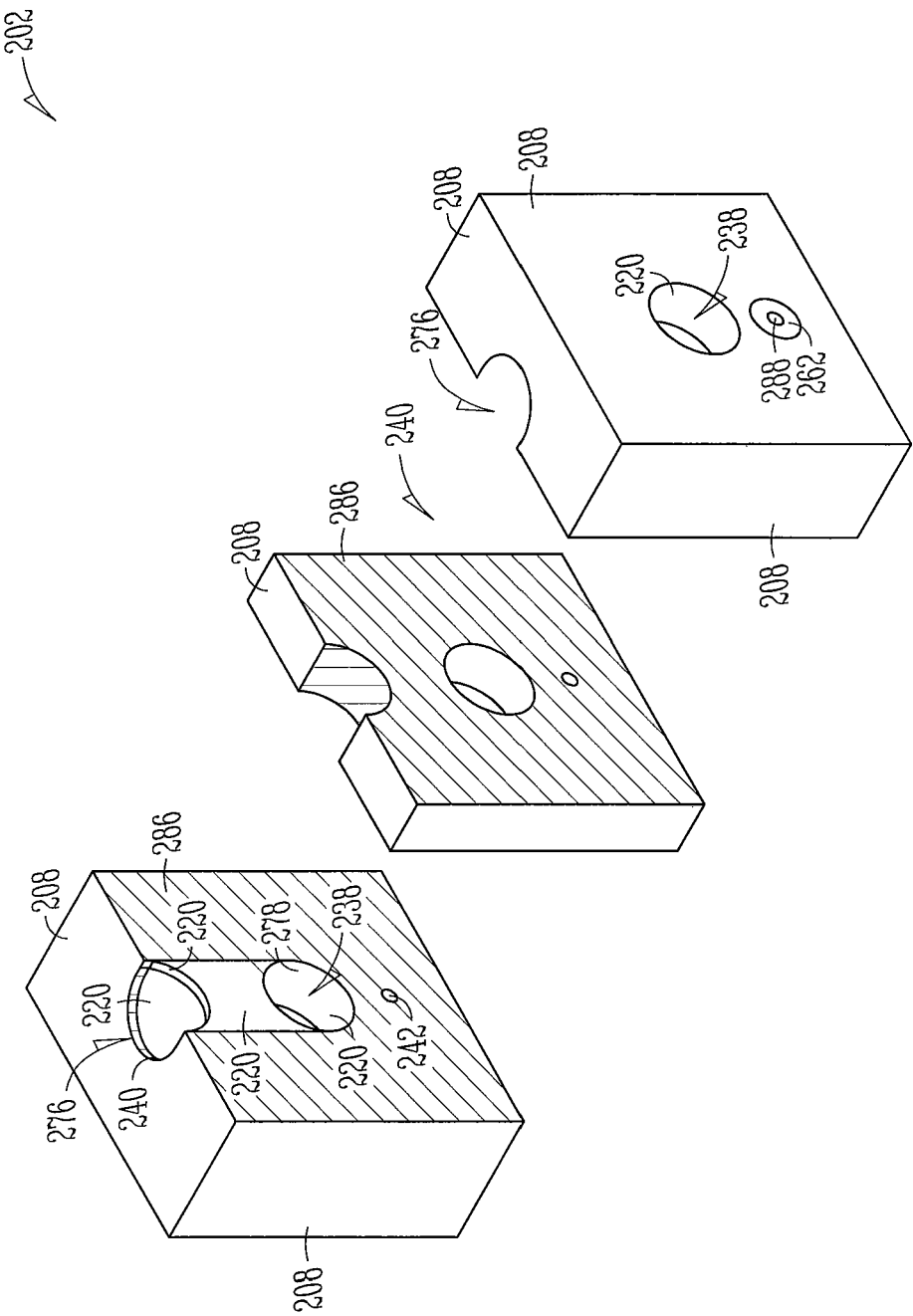
FIG. 1G shows conductive and non-conductive portions of the lamp body of FIG. 1D.

FIGS. 1E-1G show more detailed diagrams of the example plasma lamp 200 shown in FIG. 1D. The lamp 200 is shown in exploded view and includes the electrically conductive coating 208 (see FIG. 1G) provided on an internal solid dielectric 286 defining the lamp body 202. The oblong bulb 204 and surrounding interface material 216 (see FIG. 1E) are also shown. Power may be fed into the lamp 200 with an electric monopole probe closely received within a drive probe passage 288. The two opposing conductive elements 278, 280 of FIG. 1D may be formed electrically by the metallization of the bore 238 (see FIG. 1G), which extend toward the center of the lamp body 202 (see also FIG. 1D) to concentrate the electric field, and build up a high voltage to energize the lamp 200. The dipole arms 276 connected to the conductive elements 278, 280 by conductive surfaces may transfer the voltage out towards the bulb 204. The cup-shaped terminations or end portions 240 on the dipole arms 276 partially enclose the bulb 204. A feedback probe passage 242 is shown in the lamp body 202 and is to snugly receive a feedback probe 222 that connects to a drive circuit (e.g. a lamp drive circuit 206 shown by way of example in FIG. 1H). In an example embodiment the interface material 216 may be selected so as to act as a specular reflector to reflect light emitted by the plasma arc 268.

Referring to FIG. 1F, the lamp body 202 is shown to include three body portions 244, 246 and 248. The body portions 244 and 248 are mirror images of each other and may each have a thickness 250 of about 11.2 mm, a height 252 of about 25.4 mm and width 254 of about 25.4 mm. The inner portion 246 may have a thickness 255 of about 3 mm. The lamp opening 210 in the upper surface 214 may be partly circular cylindrical in shape having a diameter 256 of about 7 mm and have a bulbous end portions with a radius 258 of about 3.5 mm. The drive probe passage 288 and the feedback probe passage 242 may have a diameter 260 of about 1.32 mm. A recess 262 with a diameter 264 is provided in the body portion 248. The bores 238 of the conductive elements 278, 280 may have a diameter 266 of about 7 mm.

An example analysis of the lamp 200 using 3-D electromagnetic simulation based on the finite-integral-time-domain (FITD) method is described below with reference to FIGS. 3-5. The electric (E) field (see FIG. 5), the magnetic (H) field (see FIG. 4), and the power flow (which is the vectoral product of the E and H fields—see FIG. 3), are separately displayed for insight, although they are simply three aspects of the total electromagnetic behavior of the lamp 200. In the example embodiment simulated in the three figures, a drive probe 270 couples power into the lamp body 202 and a feedback probe 272 is placed on the same side of the body 202 as the drive probe 270. This is an alternative embodiment representing only a superficial difference from the configuration of drive and feedback probes for use in the example embodiment shown in FIGS. 1E-1G.

Figure 1H:
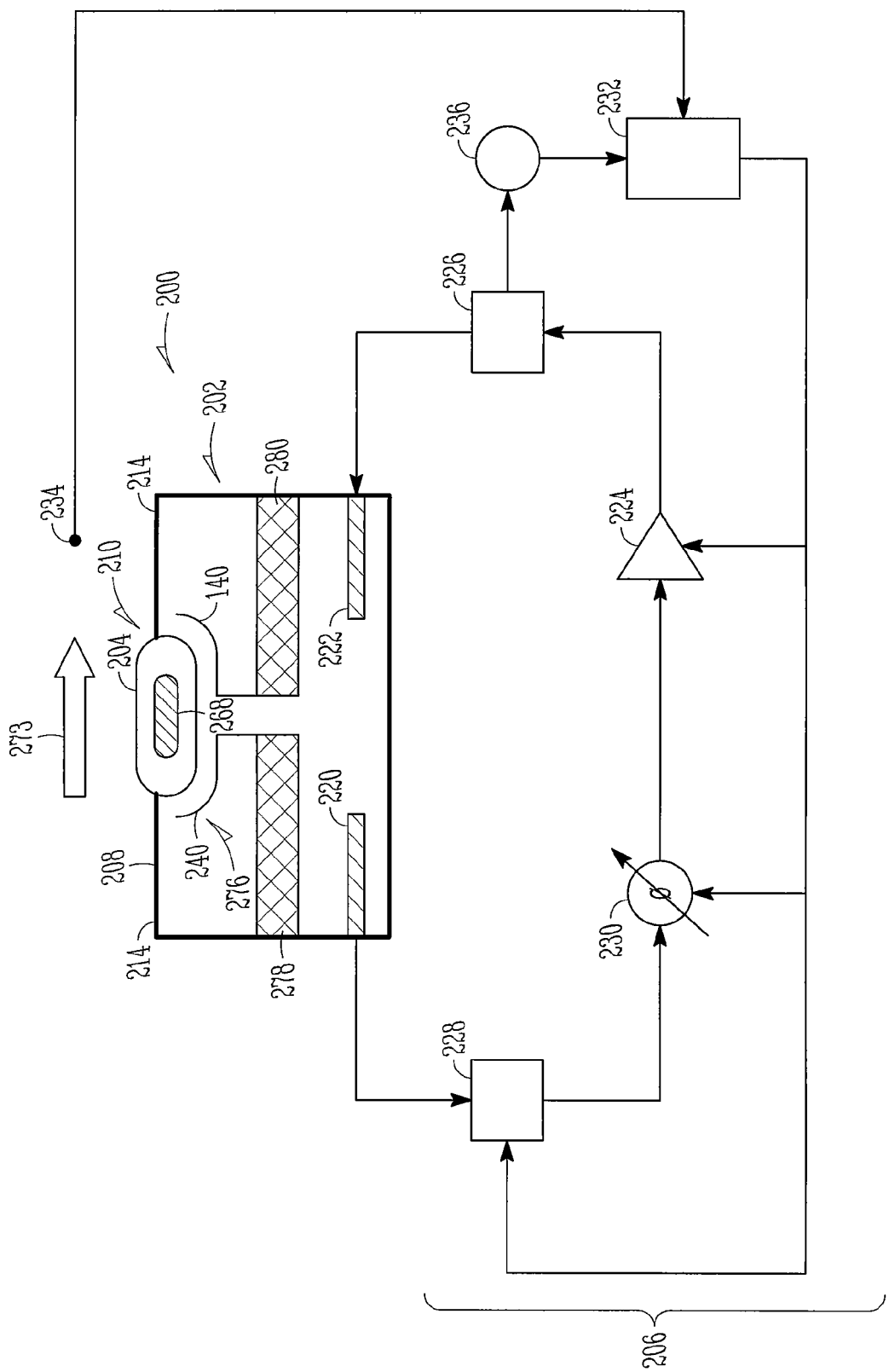
FIG. 1H is a schematic diagram of an example lamp drive circuit coupled to the lamp shown in FIG. 1D.

In the example lamp drive circuit 206 shown in FIG. 1H, the control electronics 232 is connected to the attenuator 228, the phase shifter phase shifter 230 and the amplifier 224. The control electronics 232 provide signals to adjust the level of attenuation provided by the attenuator 228, the phase of phase shifter 230, the class in which the amplifier 224 operates (e.g., Class A/B, Class B or Class C mode) and/or the gain of the amplifier 224 to control the power provided to the lamp body 202. In one example, the amplifier 224 has three stages, a pre-driver stage, a driver stage and an output stage, and the control electronics 232 provides a separate signal to each stage (drain voltage for the pre-driver stage and gate bias voltage of the driver stage and the output stage). The drain voltage of the pre-driver stage can be adjusted to adjust the gain of the amplifier 224. The gate bias of the driver stage can be used to turn on or turn off the amplifier 224. The gate bias of the output stage can be used to choose the operating mode of the amplifier 224 (e.g., Class A/B, Class B or Class C). The control electronics 232 can range from a simple analog feedback circuit to a microprocessor/microcontroller with embedded software or firmware that controls the operation of the lamp drive circuit 206. The control electronics 232 may include a lookup table or other memory that contains control parameters (e.g., amount of phase shift or amplifier gain) to be used when certain operating conditions are detected. In example embodiments, feedback information regarding the lamp's light output intensity is provided either directly by the optical sensor 234, e.g., a silicon photodiode sensitive in the visible wavelengths, or indirectly by the RF power sensor 236, e.g., a rectifier. The RF power sensor 236 may be used to determine forward power, reflected power or net power at the drive probe 270 to determine the operating status of the lamp 200. Matching network 226 may be designed to also include a directional coupler section, which may be used to tap a small portion of the power and feed it to the RF power sensor 236. The RF power sensor 236 may also be coupled to the lamp drive circuit 206 at the feedback probe 272 to detect transmitted power for this purpose. In some example embodiments, the control electronics 232 may adjust the phase shifter 230 on an ongoing basis to automatically maintain desired operating conditions.

As described above, the phase of the phase shifter 230 and/or gain of the amplifier 224 may also be adjusted after startup to change the operating conditions of the lamp 200, which can be used for brightness adjustment or to modulate the light to adjust for video effects in a projection display.

As described above, the phase shifter 230 can be modulated to spread the power provided by the lamp circuit 206 over a larger bandwidth, which may reduce EMI at any one frequency and thereby help with compliance with FCC regulations regarding EMI As described above, the amplifier 224 may be operated at different bias conditions during different modes of operation for the lamp 200, which may impact DC-RF efficiency.

Figure 1I:
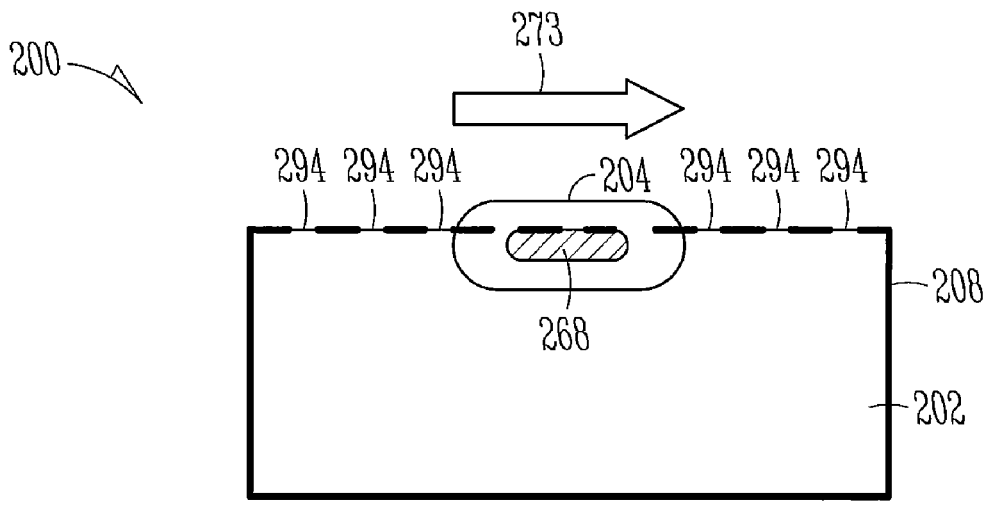
FIGS. 1I and 1J show cross-section and schematic views of further example embodiments of plasma lamps in which a bulb of the lamp is orientated to enhance an amount of collectable light.
Figure 1J:
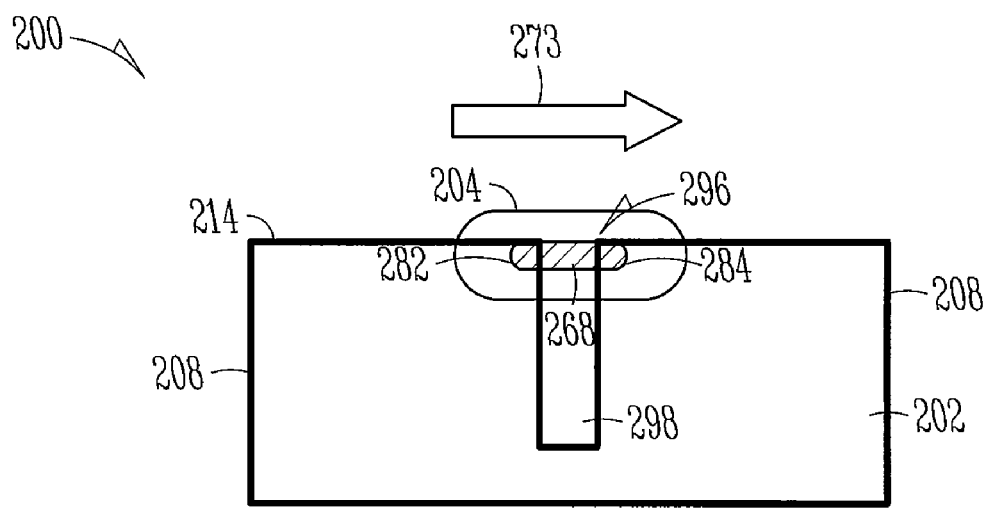

Further non-limiting example embodiments are shown in FIGS. 1I and 1J. However, it should be noted that these embodiments are shown merely by way of example and not limitation.

FIG. 1I shows a cross-section and schematic view of a plasma lamp 200, according to an example embodiment, in which a bulb 204 of the lamp 200 is orientated to enhance an amount of collectable light into a given etendue. The lamp 200 is shown to include a lamp body 202 including a solid dielectric resonator, and an electrically conductive coating 208. In this example, an artificial magnetic wall 294 is used to modify orientation of the electric field. An ideal magnetic wall, made from an ideal magnetic conductor which does not exist in nature, would permit an electric field to point parallel to its surface, which is the desired configuration for this example embodiment. Approximations to an ideal magnetic conductor exist in the form of a planar surface patterned with periodic regions of varying conductivity. Such a structure, belonging to the family of periodically-patterned structures collectively known as Photonic Bandgap devices, permit among other things parallel attached electric fields when the relationship between the wavelength of the field and the periodicity of the structure is correctly designed. (see: F R Yang, K P Ma, Y Qian, T Itoh, A novel TEM waveguide using uniplanar compact photonic-bandgap (UC-PBG) structure, IEEE Transactions on Microwave Theory and Techniques, November 1999, v47#11, p2092-8), which is hereby incorporated herein by reference in its entirety). For example, a unipolar compact photonic bandgap (UC-PBG) structure of the type described in this article may be used on a surface of the lamp body 202 in example embodiments to provide a magnetic boundary condition. A repeating unit used in an example photonic bandgap lattice has square pads and narrow lines with insets, as shown in FIG. 1I. The gaps between adjacent units provide capacitance. The branches and insets provide inductance. This forms a distributed LC circuit and has a particular frequency response. This structure can be tuned to provide an equivalent magnetic surface at particular frequencies, and can be scaled for different frequency bands. As a result, it is believed that a photonic bandgap lattice structure may be used in example embodiments to provide a magnetic boundary condition and adjust the orientation of the electric field to be substantially parallel to the length of the bulb 204 adjacent to a front surface of the lamp body 202. This is an example only and other structures may be used to provide a magnetic boundary condition in other embodiments.

FIG. 1J shows a cross-section and schematic view of a further example embodiment of a plasma lamp 200, in which a bulb 204 of the lamp 200 is orientated to enhance an amount of collectable light into a given etendue. The lamp 200 is shown to include a lamp body 202 including a solid dielectric resonator and an electrically conductive coating 208 which extends to a front or upper surface 214. The lamp body 202 is provided with the electrically conductive coating 208 such that there is a partial gap 296 in the electrically conductive coating 208 along a midplane of the bulb 204. An internal cavity or chamber 298 extends into the lamp body 202. The conductive coating 208 may also extends into the cavity 298. In this example embodiment, end portions 282, 284 of the bulb 204 extend below the electrically conductive coating 208 on the upper surface 214 of the lamp body 202. This lamp 200 may operates in a manner similar to a vane resonator with a solid dielectric body.

Figure 1K:
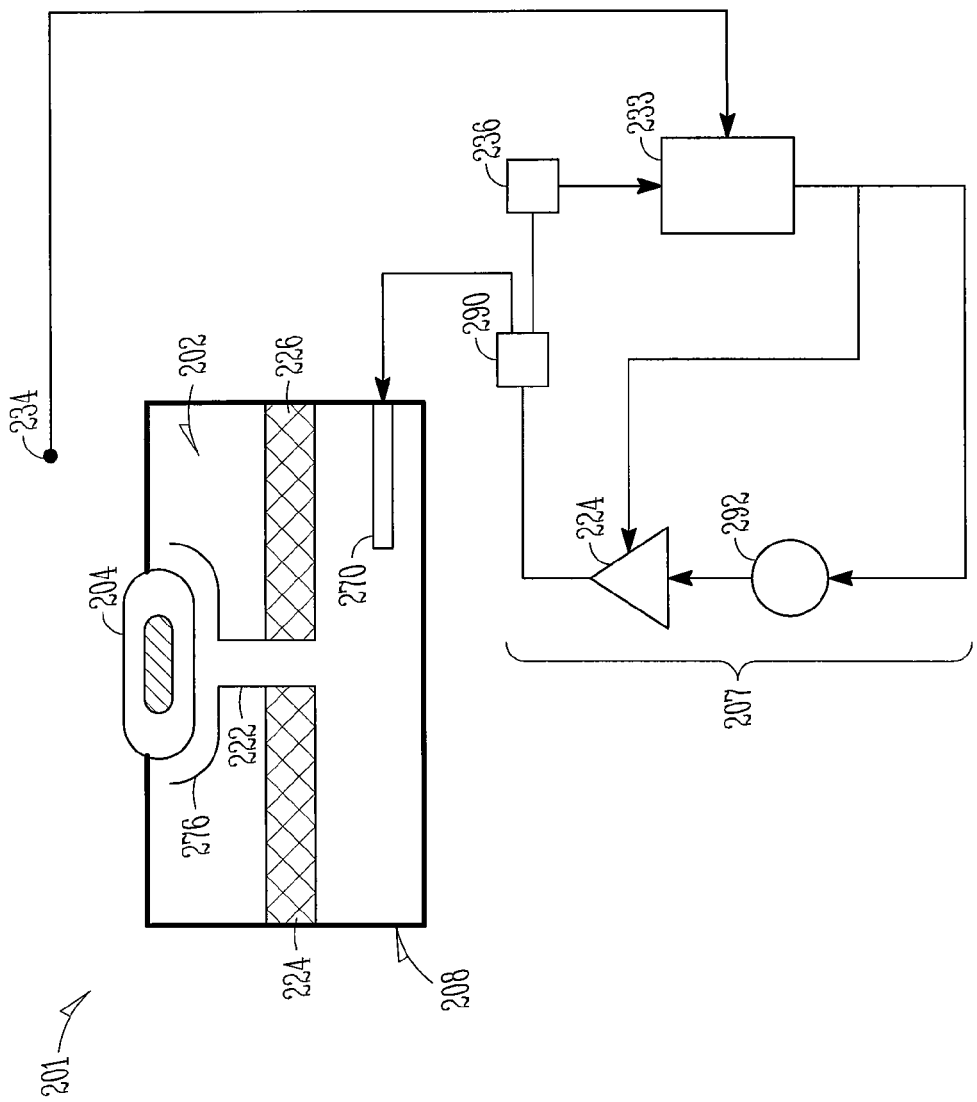
FIG. 1K is a schematic diagram showing an example lamp and lamp drive circuit according to an example embodiment.

FIG. 1K shows a cross-sectional view of a lamp 201 according to another example embodiment. The lamp 201 is similar to the lamp of FIG. 1H except that it does not have a feedback probe and uses a different power circuit. The lamp 201 includes a bulb 204, a lamp body 202, conductive elements 278 and 280, an electrically conductive layer 208, dipole arms 276, a drive probe 270 and a sensor 234. As shown in FIG. 1K, a lamp drive circuit 207 is shown to include an oscillator 292 and an amplifier 224 (or other source of radio frequency (RF) power) may be used to provide RF power to the drive probe 270. The drive probe 270 is embedded in the solid dielectric body of the lamp 201. Control electronics 233 controls the frequency and power level provided to the drive probe 270. Control electronics 233 may include a microprocessor or microcontroller and memory or other circuitry to control the lamp drive circuit 207. The control electronics 233 may cause power to be provided at a first frequency and power level for initial ignition, a second frequency and power level for startup after initial ignition and a third frequency and power level when the lamp 201 reaches steady state operation. In some example embodiments, additional frequencies may be provided to match the changing conditions of the load during startup and heat up of the plasma. For example, in some embodiments, more than sixteen different frequencies may be stored in a lookup table and the lamp 201 may cycle through the different frequencies at preset times to match the anticipated changes in the load conditions. In other embodiments, the frequency may be adjusted based on detected lamp operating conditions. The control electronics 233 may include a lookup table or other memory that contains control parameters (e.g., frequency settings) to be used when certain operating conditions are detected. In example embodiments, feedback information regarding the lamp's light output intensity is provided either directly by an optical sensor 234, (e.g., a silicon photodiode sensitive in the visible wavelengths), or indirectly by an RF power sensor 236, e.g., a rectifier. The RF power sensor 236 may be used to determine forward power, reflected power or net power at the drive probe 270 to determine the operating status of the lamp 201. A directional coupler 290 may be used to tap a small portion of the power and feed it to the RF power sensor 236. In some embodiments, the control electronics 233 may adjust the frequency of the oscillator 292 on an ongoing basis to automatically maintain desired operating conditions. For example, reflected power may be minimized in some embodiments and the control electronics may rapidly toggle the frequency to determine whether an increase or decrease in frequency will decrease reflected power. In other examples, a brightness level may be maintained and the control electronics may rapidly toggle the frequency to determine whether the frequency should be increased or decreased to adjust for changes in brightness detected by sensor 234.

The above circuits, dimensions, shapes, materials and operating parameters are examples only and other embodiments may use different circuits, dimensions, shapes, materials and operating parameters.

Figure 2:
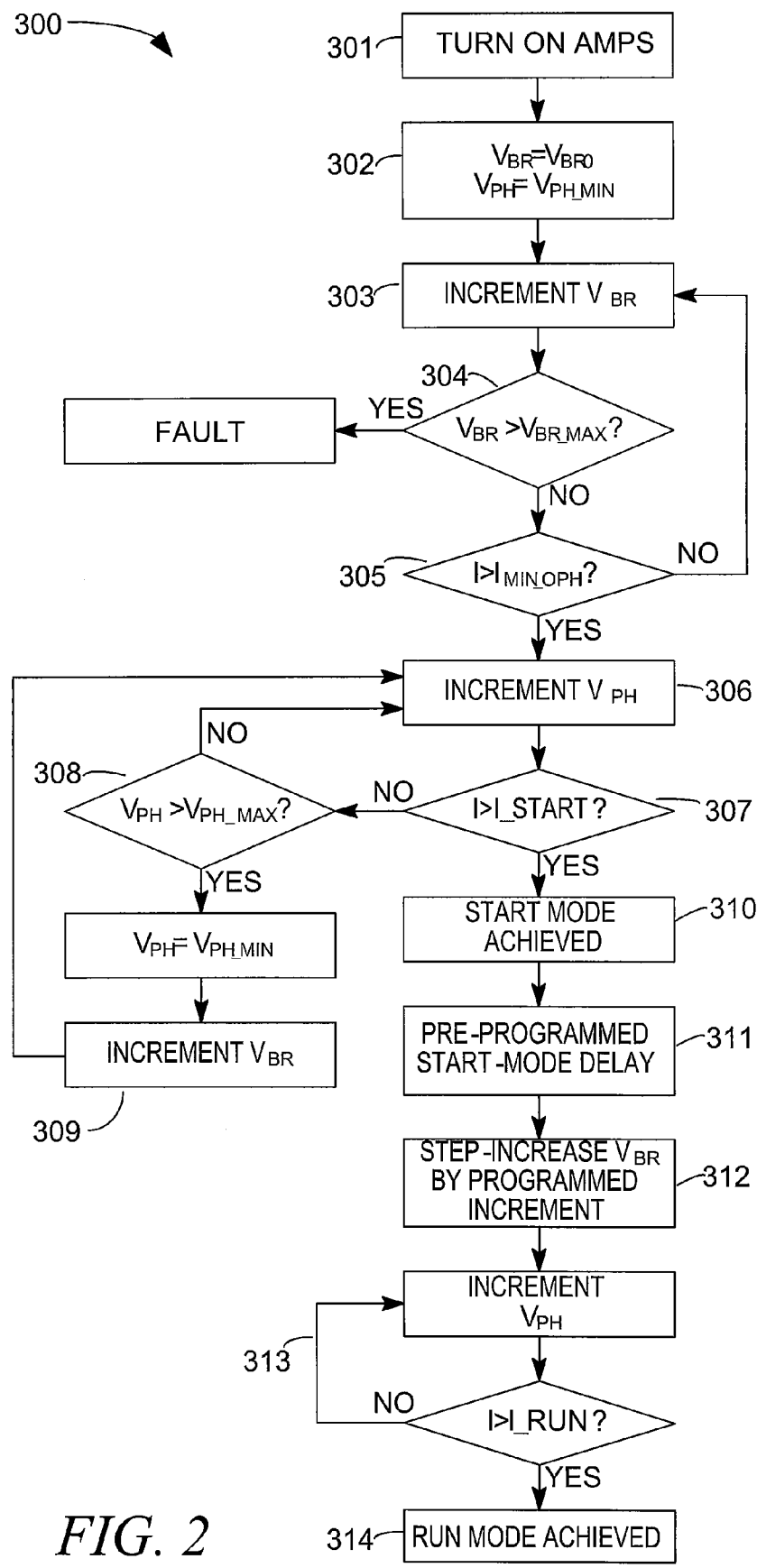
FIG. 2 is a flow chart of a method for starting an electrodeless plasma lamp, according to an example embodiment.

FIG. 2 is a flow chart illustrating a method 300 for starting an electrodeless plasma lamp, according to an example embodiment. In an example embodiment, the entire control system may regulate the lamp's current consumption (I) using the control variables Vbr, which commands the RF-gain (e.g. an amplifier 124 or 224) in the loop in FIG. 1H, and Vph, which commands the phase shift 130 in the loop in FIG. 1H. In the electrodeless lamp of various example embodiments, the feedback loop may complete a positive-feedback resonator, making the net gain and phase in the loop the natural control quantities. Some example embodiments include two main modes: Start Mode and Run Mode which may be differentiated by the desired current flow to the lamp. In an example embodiment, Start Mode is characterized by fully-developed RF oscillation in the lamp, but increasing lamp brightness due to plasma warm-up. The lamp current consumption may be held to a reduced level in example Start Modes. Example Run-Modes are also characterized by fully-developed RF oscillation in the lamp, but with lamp brightness either holding at the desired steady-state operational value, or increasing toward and nearly achieving steady state. Current consumption in Run-Mode may be controlled to be at a different level than that at. Start-Mode.

The example method 300 begins at processing block 301 with processing logic turning on the amplifiers. Next, at processing block 302, processing logic may sets the brightness control Vbr to a pre-set value Vbr0, while setting the phase control variable Vph to Vph_min (e.g., Vph_min=0). The actual initial values for Vbr and Vph are design variables, and of no intrinsic consequence. For the loop to oscillate at all, a minimum gain must be present to off-set the losses in the loop. In an example embodiment, the processing logic at block 303 is to increment Vbr by a preset amount while checking, as indicated by decision block 305, for a rise in the current I. The Vbr increment may be calibrated for each lamp design. In an example embodiment, the increment is 50 mV. When I is observed to rise above a parameter Imin__0ph, the loop gain may be sufficient to sustain oscillation, and optimization of the phase can begin. In some embodiments, a fault-containment step is included at decision block 304. In such examples, if no rise in I is observed by processing logic after incrementing Vbr from Vbr0 through a range defined by a parameter Vbr_max, the lamp is deemed defective.

The method continues at processing block 306 with processing logic incrementing Vph. In an example embodiment, Vph is increased incrementally while I is monitored. At decision block 307, when processing logic observes the lamp at more than a limit Istart, Start Mode is considered achieved (see block 310). Istart may be calibrated for each lamp design. In an example embodiment, the value is 8.5 A. If it is determined at processing block 308 that the process of incrementing Vph, I does not reach Istart before a maximum phase Vph_max is commanded, it is possible that the loop gain is insufficient. In such case, processing logic at block 309 commands Vph back to Vph_min, while Vbr is incremented, and the process repeats.

After reaching Start Mode, in some embodiments, the processing logic may wait as indicated by block 311 for a preprogrammed delay before attempting to reach Run Mode. This delay may be calibrated for each lamp design and, in an example embodiment, the range is 2-10 seconds. At block 312, the loop gain Vbr may be incremented by a preprogrammed amount. This step may be calibrated for each lamp design; an in an example embodiment, the value is 2 volts. Processing logic may increment the loop phase control at loop 313 until the lamp current consumption passes a threshold Irun. The value of Irun may be calibrated for each lamp design; and in an example embodiment, the value is 9.5 A. When processing logic determines at block 314 that I has passed Irun, Run Mode is considered achieved, and the lamp is ready for use.

Figure 3:
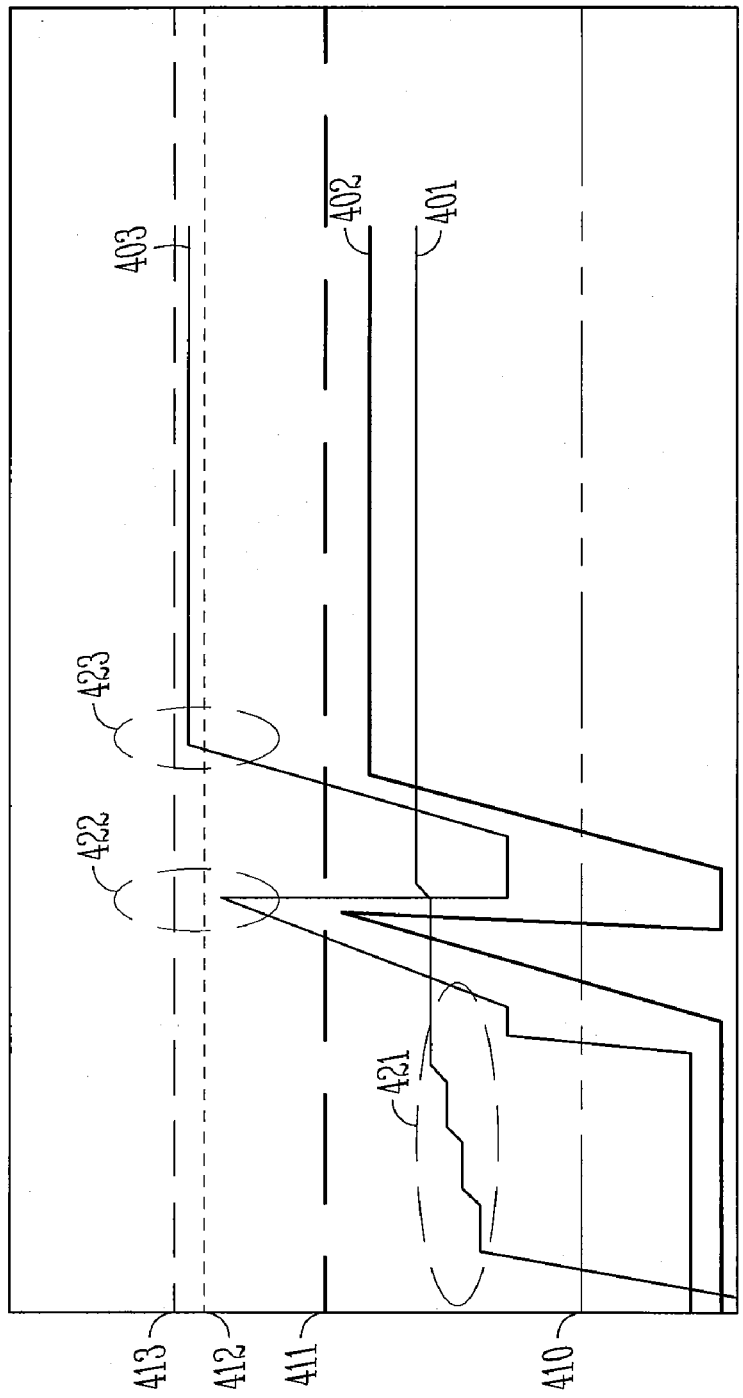
FIG. 3 is a time-trace sketch showing the example features of a method for starting an electrodeless plasma lamp according to an example embodiment.

FIG. 3 is a sketch showing in time-history form the example portion of algorithm described in the flowchart of FIG. 2 that take a lamp from a cold state to Start Mode Achieved. Trace 401 is Vbr. Trace 402 is Vph. Trace 403 is I. Limit 410 is Imin_0ph. Limit 411 is Vph_max. Limit 412 is Istart, and limit 413 is Irun. In region 421, Vbr is shown to ramp from its initial value Vbr0 to the minimum value necessary to sustain oscillation while Vph is set to 0. This is seen in the jump that current I (403) experiences at the end of 421. Vph (402) is then incremented while Vbr is held steady, with a resulting increase in I as the phase moves closer to a target value. However, region 422 illustrates a case when the value of Vbr attained at the end of region 421 is insufficient to reach the desired I_start after traversing the full range of Vph. At region 422, Vph is shown to reach Vph_max and is reset to 0. Vbr (401) is then taken up one increment, and Vph is ramped again. This time Vbr may be sufficiently high for the adjustment of Vph to result in I reaching the Istart threshold, as is depicted in region 423. These values of Vbr and Vph, then are held for the duration of Start Mode.

Figure 4:
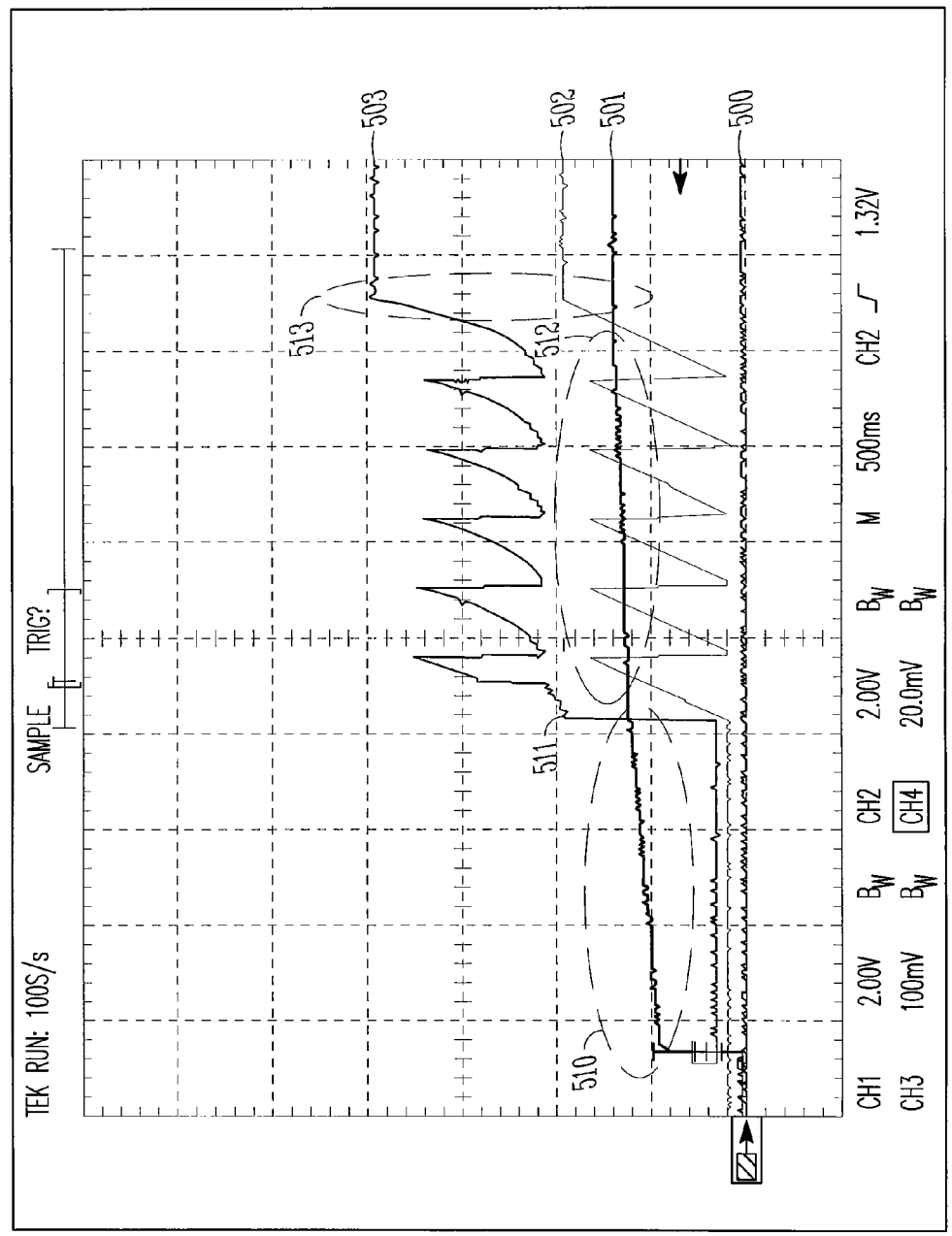
FIG. 4 is an oscilloscope trace showing the operation of a method for starting an electrodeless plasma lamp according to an example embodiment, concentrating on the transition from a cold state to the Start Mode.

FIG. 4 shows data as captured by an oscilloscope that depicts the same operation as in FIG. 3. Trace 500 is the output of an external photodiode that directly measures lamp brightness output. Trace 501 is Vbr. Trace 502 is Vph. Trace 503 is the lamp current consumption I. Initial setting of Vbr to Vbr0 is seen at approximately 75% of the first time grid. From then until the $4^{th}$ time grid, marked as region 510, Vbr is incremented while Vph remains at 0. At just past the $4^{th}$ time grid (511), the current consumption jumps, marking the start of oscillation. To test the Vph/Vbr optimization logic in this actual system, the value of Vph_max is artificially set too low in this run, resulting in the behavior shown in region 512, where Vph continuously ramps from 0 to Vph_max, with Vbr being incremented after each cycle. Just prior to the time marked by region 513, the automated test sequence re-set the value of Vph_max to a value that permits I to reach Istart. This is shown in region 513, which shows the Start Mode Achieved event.

Figure 5:
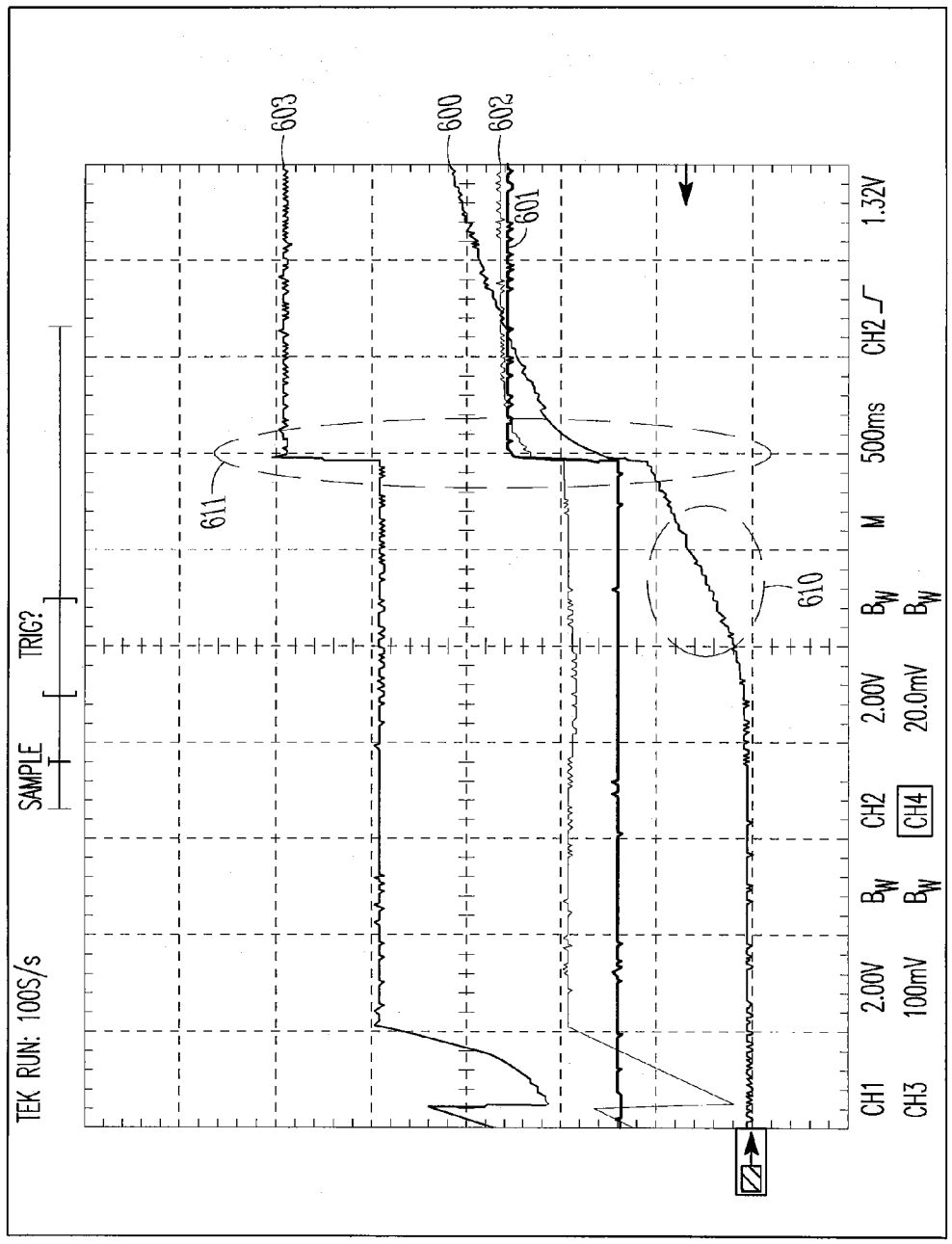
FIG. 5 is an oscilloscope trace showing the operation of a method for starting an electrodeless plasma lamp according to an example embodiment, concentrating on the transition from Start Mode to Run Mode.

FIG. 5 shows oscilloscope data from the same system and the same test as that in FIG. 4, but later in time. Like-numbered traces (500-503) depict like quantities. The leftmost time grid shows the same Start Mode Achieved event as in region 513 of FIG. 4. For the remainder of the programmed delay in Start Mode, the lamp warms up and the plasma begins to show significant brightness output increase, starting at region 610. The transition to Run Mode occurs at region 611. Vbr (501) makes a commanded step increase, at which point the lamp current follows with a nearly immediate increase that in this case quickly passes the Irun threshold. This obviates the need for much Vph adjustment, as seen in trace 502 in region 611. Run Mode is considered achieved after region 611 by the I>Irun criterion; however, it is seen that the lamp brightness continues to increase at the end of this data frame. Because I is held constant from this point forward, the brightness will quickly settle to a steady state.

Example embodiments are herein described that provide startup of electrodeless plasma lamps that rely primarily on feedback of lamp current consumption. These example embodiments are in contrast to startup systems and methods that rely primarily on sensing of voltage (electric field strength) applied to the lamp while controlling the phase shift and gain of the amplifier. A problem with this later approach is that the desired voltage is a function of certain environmental conditions such as lamp body temperature.

What is claimed is:

1. A electrodeless plasma lamp comprising:
   a lamp body;
   a bulb adjacent to the lamp body, the bulb containing a fill that forms a plasma when RF power is coupled to the fill from the lamp body;
   a radio frequency (RF) feed coupled to the lamp body;
   a RF power source for coupling power into the lamp body through the RF feed; and
   a processor configured to:
      set a phase control parameter to a minimum phase value while sequentially incrementing a brightness control parameter, the brightness control parameter controlling current applied to the lamp body and the phase control parameter controlling a phase of the current; and
      when the current reaches an initial reference current, maintaining the brightness control parameter at the reference value and sequentially incrementing the phase control parameter.

2. The electrodeless plasma lamp of claim 1, wherein the initial reference current is sufficient to sustain oscillation in the plasma lamp.

3. The electrodeless plasma lamp of claim 1, wherein a fault mode is identified when the brightness control parameter reaches a reference maximum value before the current reaches the initial reference current.

4. The electrodeless plasma lamp of claim 1, wherein one or more of the initial reference current and the lamp start reference current dependent upon calibration of the plasma lamp.

5. The electrodeless plasma lamp of claim 1, wherein the phase control parameter is sequentially increased until a lamp start reference current is reached, the lamp start reference current being greater than the initial reference current.

6. The electrodeless plasma lamp of claim 1, wherein the processor:
   monitors when the phase control parameter reaches a maximum reference value prior to a lamp start reference current being reached;
   applies a single increment to the brightness control parameter and resets the phase control parameter to the minimum phase value; and
   sequentially increments the phase control parameter until the lamp start reference current is reached.

7. The electrodeless plasma lamp of claim 1, wherein the initial reference current is associated with the minimum phase value.

8. The electrodeless plasma lamp of claim 1, wherein the brightness control parameter controls the RF gain of an RF amplifier of the RF power source.

9. The electrodeless plasma lamp of claim 1, wherein the phase control parameter controls a phase shift in a feedback loop of the RF power source and lamp body.

10. The electrodeless plasma lamp of claim 9, wherein the feedback loop completes a positive feedback resonator.

11. The electrodeless plasma lamp of claim 1, wherein the minimum phase value is about 0.

12. A method of starting an electrodeless plasma lamp, the method comprising:
   coupling current from a power source to a lamp body and a bulb adjacent to the lamp body, the bulb including fill that forms plasma when power is coupled to the lamp body;
   using at least one processor, setting a phase control parameter to a minimum phase value while sequentially incrementing a brightness control parameter, the brightness control parameter controlling the current applied to the lamp body and the phase control parameter controlling a phase of the current; and
   when the current reaches an initial reference current, maintaining the brightness control parameter at the initial reference value and sequentially incrementing the phase control parameter.

13. The method of claim 12, wherein the initial reference current is sufficient to sustain oscillation in the plasma lamp.

14. The method of claim 12, comprising identifying a fault mode when the brightness control parameter reaches a reference maximum value before the current reaches the initial reference current.

15. The method of claim 12, wherein one or more of the initial reference current and the lamp start reference current are dependent upon calibration of the plasma lamp.

16. The method of claim 12, wherein the phase control parameter is sequentially increased until a lamp start reference current is reached, the lamp start reference current being greater than the initial reference current.

17. The method of claim 12, comprising:
   monitoring when the phase control parameter reaches a maximum reference value prior to a lamp start reference current being reached;
   applying a single increment to the brightness control parameter and resetting the phase control parameter to the minimum phase value; and
   sequentially incrementing the phase control parameter until the lamp start reference current is reached.

18. The method of claim 12, wherein the initial reference current is associated with the minimum phase value.

19. The method of claim 12, wherein the brightness control parameter controls the RF gain of an RF amplifier of the power source.

20. The method of claim 12, wherein the phase control parameter controls a phase shift in a feedback loop of the power source and lamp body.

21. The method of claim 20, wherein the feedback loop completes a positive feedback resonator.

22. The method of claim 12, wherein the minimum phase value is about 0.

* * * * *